(12) United States Patent
Swaroop et al.

(10) Patent No.: US 11,615,275 B2
(45) Date of Patent: Mar. 28, 2023

(54) IDENTIFYING OVERFILLED CONTAINERS

(71) Applicant: The Heil Co., Chattanooga, TN (US)

(72) Inventors: Prem Swaroop, Arlington, MA (US);
Atish P. Kamble, Arlington, MA (US);
Bodhayan Dev, Marlborough, MA (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/204,569

(22) Filed: Mar. 17, 2021

(65) Prior Publication Data
US 2021/0326658 A1 Oct. 21, 2021

Related U.S. Application Data

(60) Provisional application No. 63/012,895, filed on Apr. 20, 2020.

(51) Int. Cl.
*G06K 9/62* (2022.01)
*G06V 10/56* (2022.01)
*G06V 10/20* (2022.01)
*G06V 20/56* (2022.01)

(52) U.S. Cl.
CPC ......... *G06K 9/6262* (2013.01); *G06K 9/6257* (2013.01); *G06V 10/255* (2022.01); *G06V 10/56* (2022.01); *G06V 20/56* (2022.01)

(58) Field of Classification Search
CPC .... G06K 9/6262; G06K 9/6257; G06V 10/56; G06V 10/255; G06V 20/56
USPC .......................................................... 382/103
See application file for complete search history.

(56) References Cited

U.S. PATENT DOCUMENTS

| | | | |
|---|---|---|---|
| 2009/0092284 A1* | 4/2009 | Breed | G01S 7/4802 |
| | | | 382/103 |
| 2014/0379588 A1 | 12/2014 | Gates et al. | |
| 2015/0348252 A1 | 12/2015 | Mask | |
| 2017/0293800 A1 | 10/2017 | Babenko et al. | |
| 2020/0034785 A1 | 1/2020 | Romano et al. | |
| 2020/0082167 A1* | 3/2020 | Shalom | G06V 20/52 |

(Continued)

FOREIGN PATENT DOCUMENTS

WO WO 2017176855 10/2017

OTHER PUBLICATIONS

International Search Report and Written Opinion in International Appln No. PCT/US2021/022761, dated Jul. 9, 2021, 7 pages.

*Primary Examiner* — Michael R Neff
(74) *Attorney, Agent, or Firm* — Fish & Richardson P.C.

(57) ABSTRACT

Among other things, the techniques described herein include a method for receiving a plurality of images of one or more containers while the one or more containers are being emptied, the plurality of images comprising a training set of images and a validation set of images; labeling each image of the plurality of images as including either an overfilled container or a not-overfilled container; processing each image of the plurality of images to reduce bias of a machine learning model; training, and based on the labeling, the machine learning model using the plurality of images; and optimizing the machine learning model by performing learning against the validation set, the optimized machine learning model being used to generate a prediction for a new image of a container, the prediction indicating whether the container in the new image was overfilled prior to the new container being emptied.

17 Claims, 20 Drawing Sheets

(56) References Cited

U.S. PATENT DOCUMENTS

2020/0193620 A1\* 6/2020 Armstrong ................ G06T 7/20
2021/0158308 A1\* 5/2021 Armstrong ............ G06T 7/0008

\* cited by examiner

Monitor application 140

Event Reviews

Review Type: Overages    Segment: Segment A    Vehicle: ABC1234    Date: 6/1/2017

| Event ID | Review Type | Segment | Vehicle | Date | Reviewer | Detail Link |
|---|---|---|---|---|---|---|
| 12345601 | Overage | Segment A | ABC1234 | 6/1/2017 12:22:22 pm | J Smith | link |
| 12345602 | Overage | Segment A | ABC1234 | 6/1/2017 12:24:13 pm | J Smith | link |
| 12345603 | Overage | Segment A | ABC1234 | 6/1/2017 12:25:56 pm | J Smith | link |
| 12345604 | Overage | Segment A | ABC1234 | 6/1/2017 12:29:32 pm | J Smith | link |
| 12345605 | Overage | Segment A | ABC1234 | 6/1/2017 12:31:05 pm | J Smith | link |
| 12345606 | Overage | Segment A | ABC1234 | 6/1/2017 12:33:25 pm | J Smith | link |
| 12345607 | Overage | Segment A | ABC1234 | 6/1/2017 12:34:17 pm | J Smith | link |
| 12345608 | Overage | Segment A | ABC1234 | 6/1/2017 12:37:30 pm | J Smith | link |
| 12345609 | Overage | Segment A | ABC1234 | 6/1/2017 12:39:22 pm | J Smith | link |
| 12345610 | Overage | Segment A | ABC1234 | 6/1/2017 12:44:15 pm | J Smith | link |
| 12345611 | Overage | Segment B | XYZ5322 | 6/1/2017 12:46:18 pm | J Smith | link |
| 12345612 | Overage | Segment B | XYZ5322 | 6/1/2017 12:48:35 pm | J Smith | link |
| ... | | | | | | |

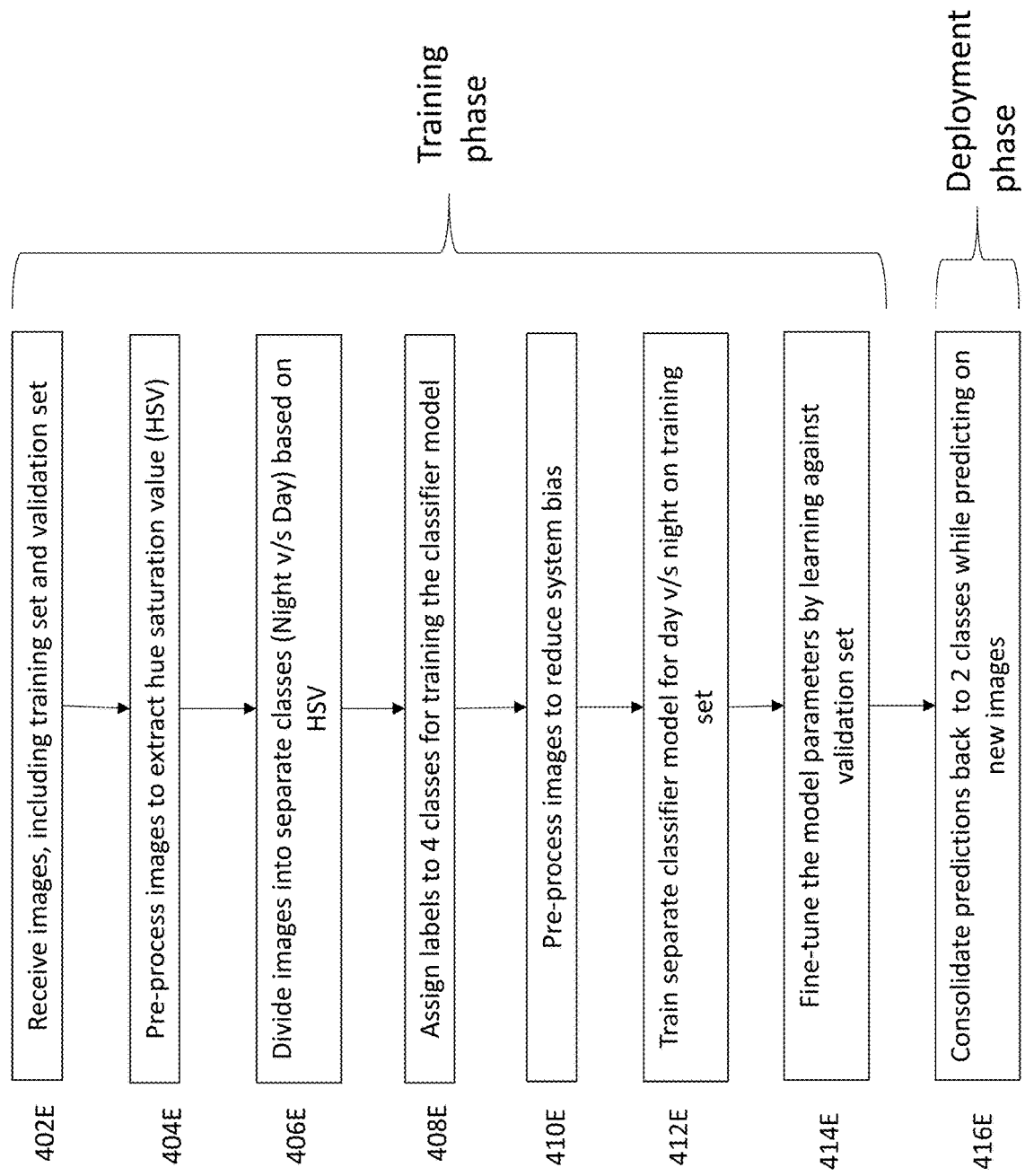

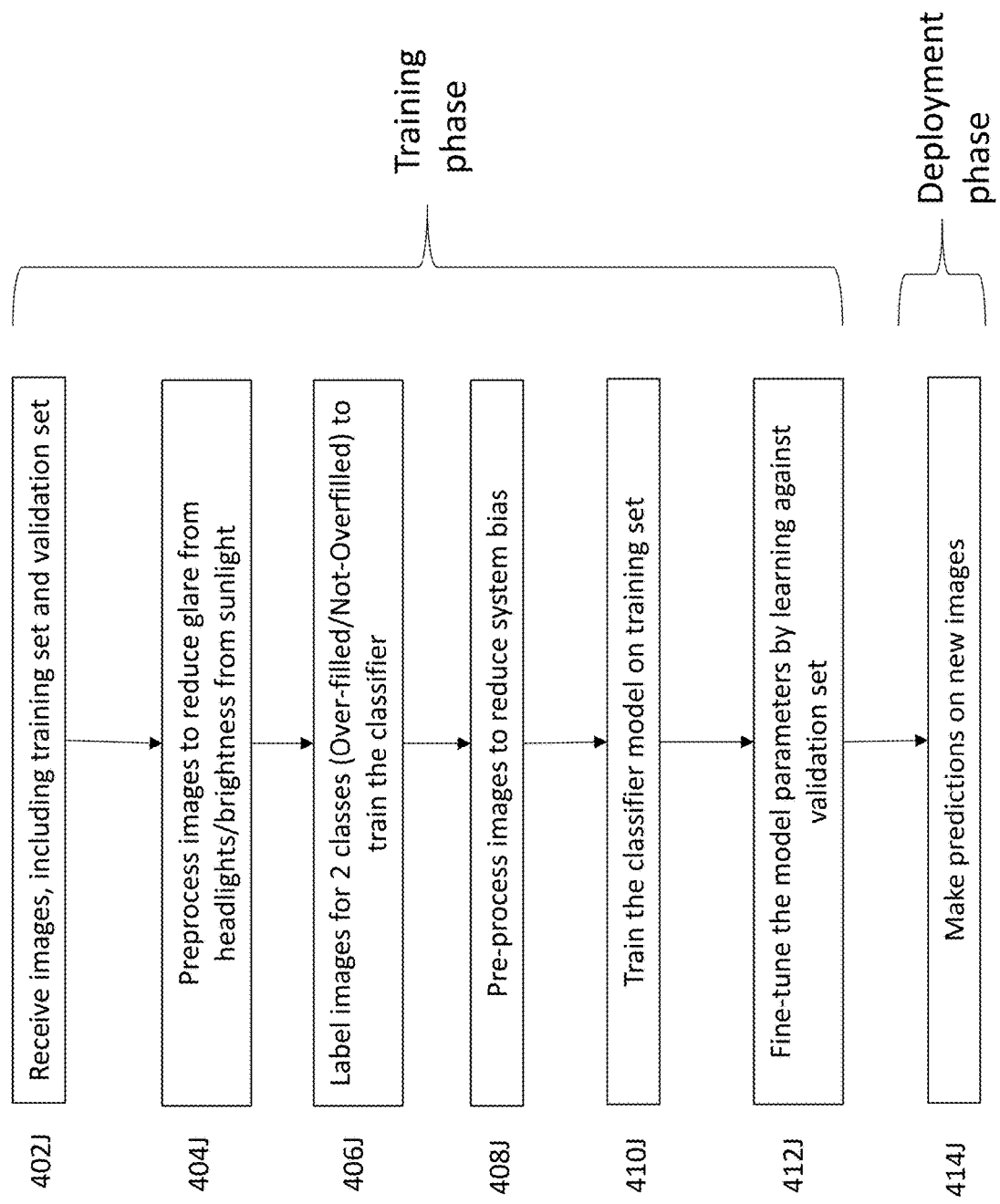

IDENTIFYING OVERFILLED CONTAINERS

CLAIM OF PRIORITY

This application claims the benefit of U.S. Provisional Application Ser. No. 63/012,895, filed on Apr. 20, 2020. The entire contents of the foregoing are incorporated herein by reference.

TECHNICAL FIELD

This disclosure generally relates to identifying overfilled containers, e.g., based on the use of machine learning models.

BACKGROUND

Identification of overfilled containers is useful in many industries. For example, in the refuse industry, refuse container overages, container damage, and misplacement, may pose complications for refuse collection and customer billing. A refuse collection company may operate a fleet of refuse collection vehicles that operate regularly to collect refuse from the containers of various customers and transport the refuse to a processing site. An overage can occur, for example, when a container is filled above its rim, e.g., causing the lid to not close completely. If a customer consistently overfills their container(s), creating an overage, the refuse collection company may lose revenue by collecting more refuse than the company agreed to collect from the customer. Moreover, an overfilled container may lead to operational problems in the mechanism(s) that empty the container into the vehicle. Contracts between the company and its customers are priced, and the containers are sized, based on an expected amount of refuse to be collected. Accordingly, a refuse collection company typically charges an overage fee for an overfilled container.

SUMMARY

Among other things, the techniques described herein include a method for receiving a plurality of images obtained from one or more vehicles of one or more containers while the one or more containers are being emptied, the plurality of images comprising a training set of images and a validation set of images; labeling each image of the plurality of images as including either an overfilled container or a not-overfilled container; pre-processing each image of the plurality of images to reduce bias of a machine learning model; training, and based on the labeling, the machine learning model using the plurality of images; and optimizing the machine learning model by performing learning against the validation set, the optimized machine learning model being used to generate a prediction for a new image of a container, the prediction indicating whether the container in the new image was overfilled prior to the new container being emptied.

The subject matter described herein has many advantages. For example, the use of the machine learning models to determine which containers were overloaded prior to the emptying of the container can prevent such determination from being performed manually. Furthermore, machine learning models can allow the backend server to quickly review large volume of container data, thereby enabling this solution effectively even when a refuse collection company operates a large fleet of RCVs, each of which may have the capability of installing several cameras, each of which may capture many images, thereby preventing the process of identifying overloaded containers from preventing scalability efforts of refuse collection companies. Additionally, machine learning models can be continually trained based on patterns specific to clients of the refuse collection company, thereby allowing those models to efficiently identify overloaded containers with reduced computational latency. Moreover, as the image data can have several dimensions—that can indicate, for example, time of day when container is emptied, geographic location, size of the container, shape of the container, and/or the like—use of the machine learning models are effective because machine learning models can be efficiently implemented on multidimensional data. Furthermore, the backend server improves the accuracy of identification of overloaded containers by preprocessing images prior to such identification by the machine learning models, thereby reducing error susceptibility associated with conventional machine learning techniques.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A-2D illustrate example user interfaces for identifying container characteristic(s), according to implementations of the present disclosure.

FIGS. 4A-4K illustrate algorithmic process for implementing machine learning models to identify container overage(s) and/or other issue(s), according to implementations of the present disclosure.

DETAILED DESCRIPTION

Figure 1A:
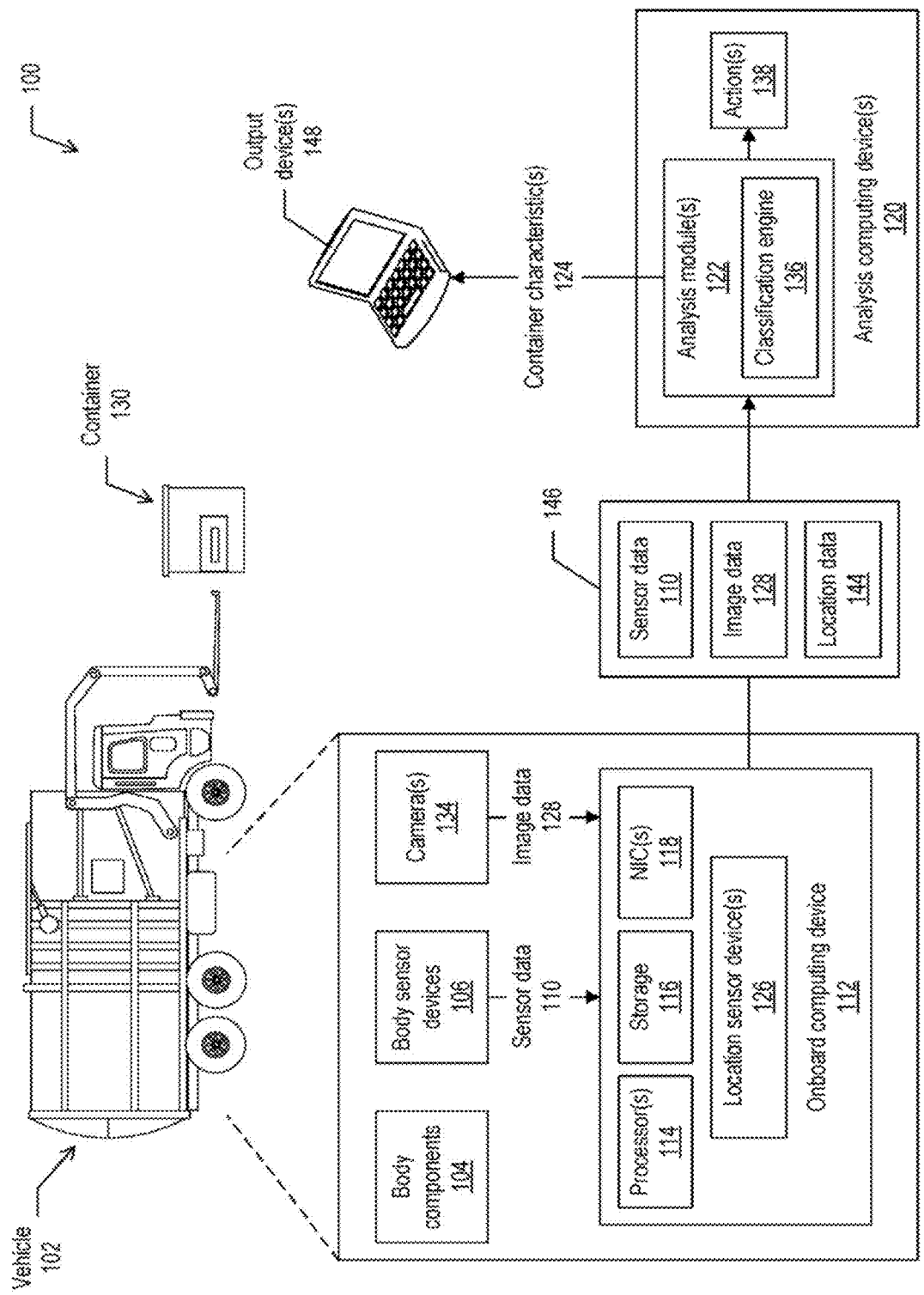
FIGS. 1A and 1B illustrate example systems for identifying container overage(s) and/or other issue(s), according to implementations of the present disclosure.

Machine learning models (also referred to simply as models) are trained using deep learning techniques on images of containers obtained while those containers are being emptied or filled. Different models can be trained for different customers, e.g., which may use different respective types of containers, have different environments, service at different times, etc. A company operating a fleet of vehicles can deploy the trained models to automatically identify—using an image obtained by a vehicle of a container being emptied or a container being filled—whether a container being emptied is overfilled or a container being filled has been overfilled. A container is "overfilled" (sometimes referred to as "overloaded") if it is filled beyond a predefined capacity. For example, a refuse collection company operating many refuse collection vehicles (RCVs) can deploy such models on images of refuse containers while being emptied to automatically identify overloaded containers within those images. Identification of overages in containers can help identify customers that run afoul of their refuse collection contracts with the refuse collection company, which can in turn allow the refuse collection company to charge overage fees for non-compliance with existing contracts. In another example, a gas or oil dispensing company that provides gas or oil to gas stations can deploy such models to images of oil or gas collection containers at various gas stations while being filled to determine under-filled or overfilled containers. Determination of under-filled containers can help with accounting and supply chain requirements, while identification of overfilled containers can raise a timely alarm of a potential hazard. In yet another example, a pesticide dispensing company can deploy the models described herein to determine whether pesticide containers have been appropriately filled. The machine learning techniques described herein can be implemented on at least one computing processor (e.g. cloud computing server) and/or at least one hardware accelerator (e.g. edge) coupled to that at least one computing processor.

In the context of vehicles of refuse collection companies, an RCV can include a lift arm that is operable to empty a container into a refuse holding space of the RCV, at least one sensor that is arranged to collect sensor data indicating an operational state of the lift arm (e.g. operational state of the lift arm when the lift arm is activated to empty the container), at least one camera that is arranged to generate image data of a scene external to the RCV, and an onboard device that is communicatively coupled to the at least one sensor and the at least one camera. The onboard device can analyze the sensor data to detect at least one triggering condition that corresponds to a particular operational state of the lift arm (e.g. triggering condition can be activation/ lifting of the lift arm to empty the container. The at least one camera can generate several images of different corresponding portions of the container during a time period that is proximal to when the at least one triggering condition is present. The onboard computer can transmit the images of the container to a backend server. The backend server runs machine learning models on the transmitted images (along with other images of containers as may have been obtained by other RCVs) to determine whether the container was overloaded prior to the emptying of the container. If the container is determined as being overloaded prior to the emptying of the container, the backend server can initiate a notification (e.g. warning, citation, or a supplemental bill with additional charges, and/or the like) to a user-account associated with the container. While the description herein is focused more on refuse collection, the techniques and modeling described herein can be implemented by other companies that collect or fill containers, such as gas or oil dispensing companies, pesticide dispensing companies, or the like.

Figure 1B:
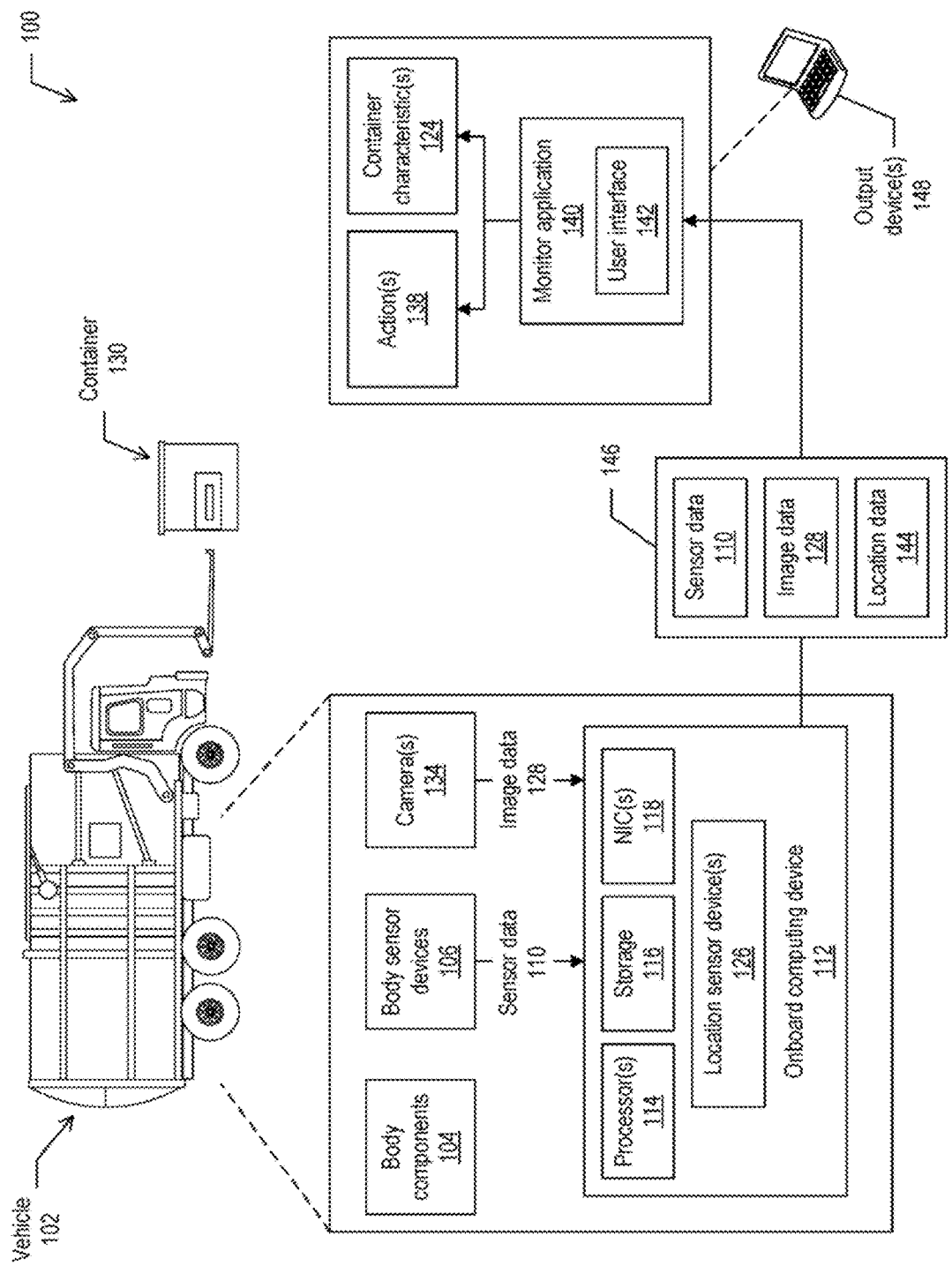

FIG. 1A illustrates an example system for identifying container overage(s) and/or other issue(s), according to implementations of the present disclosure. As shown in the examples of FIGS. 1A and 1B, a vehicle 102 can include any suitable number of body components 104. The vehicle 102 can be a refuse collection vehicle that operates to collect and transport refuse (e.g., garbage). The refuse collection vehicle can also be described as a garbage collection vehicle, or garbage truck. The vehicle 102 can be configured to lift containers 130 that contain refuse, and empty the refuse in the containers into a hopper of the vehicle, to enable transport of the refuse to a collection site, compacting of the refuse, and/or other refuse handling activities. The vehicle 102 can also handle containers in other ways, such as by transporting the containers to another site for emptying.

The body components 104 can include various components that are appropriate for the particular type of vehicle 102. For example, a garbage collection vehicle may be a truck with an automated side loader (ASL). Alternatively, the vehicle may be a front loading truck, a rear loading truck, a roll off truck, or some other type of garbage collection vehicle. A vehicle with an ASL may include body components involved in the operation of the ASL, such as arms and/or a fork, as well as other body components such as a pump, a tailgate, a packer, and so forth. A front loading vehicle, such as the example shown in FIGS. 1A-1C, may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

The vehicle 102 can include any number of body sensor devices 106 that sense body component(s), and generate sensor data 110 describing the operation(s) and/or the operational state of various body components 104. The body sensor devices 106 are also referred to as sensor devices, or sensors. Sensors may be arranged in the body components, or in proximity to the body components, to monitor the operations of the body components. The sensors may emit signals that include the sensor data 110 describing the body component operations, and the signals may vary appropriately based on the particular body component being monitored. In some implementations, the sensor data 110 is analyzed, by a computing device on the vehicle and/or by remote computing device(s), to identify the presence of a triggering condition based at least partly on the operational state of one or more body components, as described further below.

In some implementations, one or more cameras 134 can be mounted on the vehicle 102 or otherwise present on or in the vehicle 102. The camera(s) 134 can each generate image data 128 that includes one or more images of a scene external to and in proximity to the vehicle 102 and/or image(s) of an interior of the vehicle 102. For example, a camera 134 can be mounted on a dashboard of the vehicle 102 and facing outward through the windshield to capture image(s) of objects in front of the vehicle. The image data 128 can include a single (e.g., snapshot) image, multiple images, and/or a portion (e.g., clip) of video data of any suitable length. In some implementations, one or more cameras 134 are arranged to capture image(s) of a container 130 before, after, and/or during the operations of body components 104 to empty the container 130 into the hopper of the vehicle 102. For example, for a front loading vehicle, the camera(s) 134 can be arranged to image objects in front of the vehicle. As another example, for a side loading vehicle, the camera(s) 134 can be arranged to image objects to the side of the vehicle, such as a side that mounts the ASL to lift containers.

In some implementations, the sensor data and image data may be communicated from the sensors and the images, respectively, to an onboard computing device 112 in the vehicle 102. In some instances, the onboard computing device is an under-dash device (UDU), and may also be referred to as the Gateway. Alternatively, the device 112 may be placed in some other suitable location in or on the vehicle. The sensor data and/or image data may be communicated from the sensors and/or camera, to the onboard computing device 112, over a wired connection (e.g., an internal bus) and/or over a wireless connection. In some implementations, a J1939 bus connects the various sensors and/or cameras with the onboard computing device. In some implementations, the sensors and/or cameras may be incorporated into the various body components. Alternatively, the sensors and/or cameras may be separate from the body components. In some implementations, the sensors and/or cameras digitize the signals that communicate the sensor data and/or image data, before sending the signals to the onboard computing device, if the signals are not already in a digital format.

The onboard computing device 112 can include one or more processors 114 that provide computing capacity, data storage 116 of any suitable size and format, and network interface controller(s) 118 that facilitate communication of the device 112 with other device(s) over one or more wired or wireless networks.

In some implementations, the analysis of the sensor data 110 and/or image data 128 is performed at least partly by the onboard computing device 112, e.g., by processes that execute on the processor(s) 114. For example, the onboard computing device 112 may execute processes that perform an analysis of the sensor data 110 to detect the presence of a triggering condition, such as a lift arm being in a particular position in its lift cycle to empty a container into the hopper of the vehicle. On detecting the triggering condition, the device 112 can transmit one or more signals 146 to analysis computing device(s) 120, where such signal(s) 146 can include the image data 128 including one or more images of the emptied container that were captured during a time period proximal to when the container was emptied. For example, the image data 128 can include image(s) of the container that are captured prior to (e.g., just before) the container is serviced, to determine whether the container was overloaded by analyzing the image(s) before the container was serviced. In some implementations, the onboard computing device 112 transmits signal(s) 146 that include at least a portion of the sensor data 110 and/or image data 128 to the analysis computing device(s) 120, and analysis module(s) 122 executing on the device(s) 120 can analyze the sensor data 110 to detect the presence of a triggering condition.

In some instances, a triggering condition may also be based at least partly on a location of the vehicle 102, as determined through a satellite-based navigation system such as the global positioning system (GPS), or through other techniques. In such instances, the onboard computing device 112 can include location sensor device(s) 126, such as GPS receivers or other types of sensors that enable location determination. The location sensor(s) can generate location data 144 that describes a current location of the vehicle 102 at one or more times. The location data 144 can be used, alone or in conjunction with the sensor data 110, to determine the presence of a triggering condition. For example, a triggering condition can be present when the location of the vehicle 102 is at, or within a threshold distance of, a previously determined and stored location of a container 130 to be emptied. Accordingly, the location data and sensor data can be analyzed, on the device 112 and/or the device(s) 120, to determine the presence of a triggering condition. The data analysis of the sensor data 110 and/or image data 128, on the device 112, the analysis device(s) 120, or elsewhere, may be performed in real time with respect to the generation of the sensor data, image data, and/or location data. Alternatively, the analysis can be performed periodically (e.g., in a batch analysis process), such as once a day and/or at the end of a particular vehicle's refuse collection route.

In the example of FIG. 1A, the signal(s) 146 including the sensor data 110, the image data 128, and/or the location data 144 are sent to the analysis computing device(s) 120, and analysis module(s) 122 executing on the device(s) 120 analyze the data to determine whether any overages are exhibited by container(s) 130 handled by the vehicle 102. Such analysis can include determining whether a triggering condition is present, analyze image(s) of container(s) 130 that are captured at a time that is proximal to the triggering condition, and based on the image analysis, identifying those container(s) 130 that exhibit an overage. In some implementations, the analysis module(s) 122 can include a classification engine 136, which can also be described as a classifier, a model, an image classifier, or an image classification engine. The engine 136 can be trained, using any suitable ML technique, to identify images that show a container having an overage condition. For example, the engine 136 can be trained to look for various pattern(s) and/or feature(s) within image(s) that indicate the presence, or absence, of an overage, such as a lid that is not completely shut, refuse that is visible through an opening between the lid and the body of the container, and so forth. In some implementations, the engine 136 can be trained based on a (e.g., large) data set of images that have been tagged as exhibiting overages or not exhibiting overages, e.g., by an operator reviewing the image(s). In some implementations, the overage or not overage designations that are made by the operator through the monitor application 140, as described further below, can be used as training data for further train or otherwise refine the operations of the engine 136.

Container characteristic(s) 124, for example an overage condition describing one or more containers 130 that have been determined to have overages at the time of their collection, can be communicated to one or more output computing devices 148 for presentation to various users. In some instances, the container characteristic(s) 124 can be communicated as a notification, alert, warning, and/or other type of message to inform user(s) of the presence of an overage condition and/or other issue(s) present in one or more containers of interest. For example, an owner of the container, user of the container, or some other individual responsible for the container can be notified of the overage condition. In some implementations, one or more actions 138 can be performed based on the determination of an overage. Such action(s) 138 can include sending the notification(s) including the container characteristic(s) 124 as described above. Action(s) 138 can also include billing a responsible party to charge them for the overage.

In the example of FIG. 1B, the signal(s) 146 including the sensor data 110, the image data 128, and/or the location data 144 are sent to the output computing device(s) 148, and image(s) are presented in a UI 142 of a monitor application 140 executing on the device(s) 148. In some implementations, the sensor data 110, location data 144, and/or other information is analyzed on the device 112 to identify triggering conditions, and the image data 128 that is communicated to and presented on the device(s) 148 includes images of containers captured proximal to a time when the triggering condition is present. For example, one or more images of each container handled by a vehicle on its route can be captured during a time period that is a pre-determined offset prior to when the lift arm of the vehicle passes through a particular point in its container-emptying cycle. Those captured image(s), for each of one or more containers, can be communicated to the device(s) 148 and presented in the UI 142 of the monitor application 140. An operator can examine the images using the monitor application 140, and use a control of the application to flag those particular image(s), if any, that show an overage. The container(s) for which image(s) were flagged can be added to container characteristic(s) 124 that is communicated to various parties, and in some instances the flagging of overages can trigger action(s) 138 to be performed, as described above. The container characteristic(s) 124 can be included in reports that are generated and sent to various parties.

A large amount of sensor data and image data can be generated by the sensors and cameras respectively, and received by the onboard computing device 112. In some implementations, a suitable data compression technique is employed to compress the sensor data, image data, location data, and/or other information before it is communicated in the signal(s) 146, over network(s), to the remote device(s) 120 and/or 148 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the vehicle body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of a refuse vehicle, a Curotto Can® attached to a refuse vehicle, a lift arm, a refuse compression mechanism, a tailgate, and so forth, to detect events such as a lift arm cycle, a pack cycle, a tailgate open or close event, an eject event, tailgate locking event, and/or other body component operations. Various operations of body components, positions of body components, and/or states of body components can be designated as triggering conditions that trigger the capture, communication, and/or analysis of images to identify overages.

In some implementations, a vehicle includes a body controller that manages and/or monitors various body components of the vehicle. The body controller of a vehicle can be connected to multiple sensors in the body of the vehicle. The body controller can transmit one or more signals over the J1939 network, or other wiring on the vehicle, when the body controller senses a state change from any of the sensors. In some implementations, the body controller can transmit signal(s) over a wireless network that employs any suitable communication protocol. These signals from the body controller can be received by the onboard computing device that is monitoring the J1939 network. In some implementations, the onboard computing device has a GPS chip or other location determination devices that logs the location of the vehicle at each second or at other intervals. The onboard computing device can identify the body component signals (as distinguished from vehicle signals) and transmit them, along with the location (e.g., GPS) data and/or image data, to the remote computing device(s) 120 and/or 148, e.g., through a cellular connection, WiFi network, other wireless connection, or through a serial line, Ethernet cable, or other wired connection.

The sensor data 110 can be analyzed, on the device 112 or elsewhere, to identify specific signals from the body controller that indicate that a container has been serviced (e.g., the forks moved or the grabber moved, etc.). In some implementations, the signal can also be cross-referenced with the location data to locate where (e.g., geographically) the signal was captured. The signal can then be compared to a dataset of known container locations, to determine a triggering condition with greater confidence that through the use of the sensor data alone. For example, a lift arm event can be correlated with location data showing that the vehicle is at a location of a container, to infer that a triggering condition is present and that a container is being handled. The image(s) of the container, captured during or before the period when the container was handled (e.g., emptied into the vehicle), can be analyzed to look for overages.

In some implementations, the onboard computing device is a multi-purpose hardware platform. The device can include a UDU (Gateway) and/or a window unit (WU) (e.g., camera) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI hardware subcomponent can include the following: CPU, memory, controller area network (CAN) interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

The onboard computing device can determine the speed and/or location of the vehicle using various techniques. CAN_SPEED can be determined using the CAN interface and using J1939 or J1962, reading wheel speed indicator. The wheel speed can be created by the vehicle ECU. The vehicle ECU can have hardware connected to a wheel axle and can measure rotation with a sensor. GPS_SPEED can provide data from GPS and be linked, such as to a minimum of three satellites and a fourth satellite to determine altitude or elevation. Actual coordinates of the vehicle on the map can be plotted and/or verified, to determine the altitude of vehicle. SENSOR_SPEED can be provided using motion sensors, such as accelerometer, gyroscope, and so forth. These hardware component may sample at high frequency and may be used to measure delta, rate of acceleration, and derive speed from the measurements. Other speed sensors can also be used. LOCATION WITH NO GPS can be provided using the GPS chipset with dead reckoning, and can derive actual vehicle location and movement by using a combination of SENSOR_SPEED and CAN_SPEED. Even if GPS is not available, some systems can determine accurately where the vehicle is based on such dead reckoning.

Figure 1C:
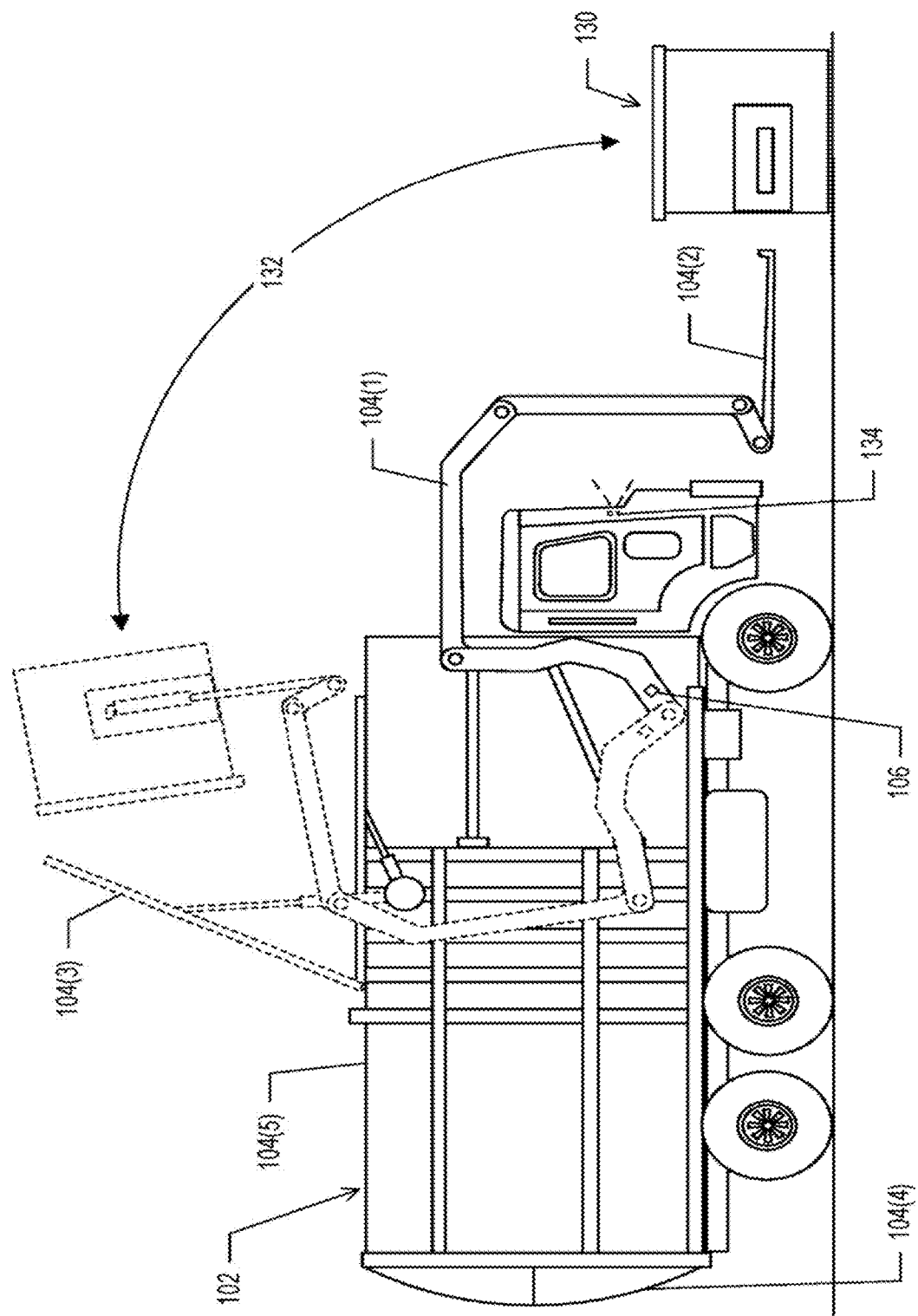
FIG. 1C illustrates an example schematic of a refuse collection vehicle (RCV), according to implementations of the present disclosure.

FIG. 1C illustrates an example schematic of a refuse collection vehicle, according to implementations of the present disclosure. As shown in the example of FIG. 1C, a vehicle 102 can include any suitable number and type of body components 104 according to the design and/or purpose of the vehicle 102. For example, a vehicle 102 can include body components 104 including, but not limited to: a lift arm 104(1), a grabber mechanism 104(2), a top lid or hopper lid 104(3), a back gate or tailgate 104(4), and a hopper 104(5) to hold refuse during its transport. One or more sensors 106 can be situated to determine the state and/or detect the operations of the body components 104. In the example shown, the lift arm 104(1) includes a sensor 106 that is arranged to detect the position of the arm 104(1), such as during its cycle 132 to lift a container 130 and empty it into the hopper 104(5). The vehicle 102 can also include one or more cameras 134 that capture images in proximity to the vehicle 102 and/or, in some instances, of the interior of the vehicle. In the example shown, a camera 134 is positioned to visualize objects in front of the vehicle 102, such as container(s) 130 being handled by the front-loading vehicle shown in the example. The camera(s) 134 may also be placed in other positions and/or orientations. For example, a side-loading vehicle 102 (e.g., with an ASL) can have a camera 134 affixed to its side to capture image(s) of container(s) being processed using the side-loading mechanism.

The sensor data can be analyzed to determine the triggering condition that indicates a container is being serviced, was serviced, or is about to be serviced. Based on the triggering condition, one or more images captured by the camera(s) can be analyzed to look for any overages. For example, a triggering condition can be a particular point in the cycle of the lift arm to lift a container and empty it into the hopper. As another example, a triggering condition can be a cycle of the top lid (e.g., lid to the hopper) that indicates the top lid is being opened to empty a container into the hopper. As another example, a triggering condition can be a cycle of the grabber to grab a container for emptying into the hopper. The triggering condition can be used to determine a time, or time period, of the image(s) to be analyzed. For example, the time period can be a predetermined offset prior to the triggering condition, such that the images analyzed are those that were captured just prior to the container being emptied into the hopper. In a particular example, the analyzed images can include images that were captured between 5 and 10 seconds prior to the initiation of the cycle of the lift arm to lift a container and empty it into the hopper, or 5-10 seconds prior to the activation of a proximity switch sensor that indicates when the lift arm is 75% through its motion to empty a container into the hopper. Accordingly, the analyzed images are those taken immediately prior to a service event in which a container is emptied into the hopper of a refuse vehicle.

In some implementations, a predetermined offset can be employed that is a time based offset, as described above, for example to analyze image(s) that are captured a particular period of time (e.g., X seconds) prior to the triggering condition. Alternatively, or in addition to using a time based offset, implementations can employ a distance based offset in the analysis. For example, the image(s) analyzed can be image(s) that are captured a particular distance (e.g., Y feet) from the container that is about to be emptied. In such examples, the location data from location sensor device(s) 126 can be employed to determine how far back in time to go to get the image(s) that were taken the threshold distance from the container (e.g., eight feet in front of the container). In other words, the predetermined value can be the distance between the container and the vehicle prior to the triggering condition. Using the location data, a calculation can be performed to determine how many seconds to go back (e.g., from when the container was emptied) to identify those image(s) for which the distance between the vehicle and container was the specified predetermined distance.

In some implementations, the sensor data can be used in correlation with location data to determine the presence of a triggering condition that determines a time period for images to be analyzed. For example, the detection of a lift arm transiting through the 75% point in its cycle, in conjunction with a determination that the current GPS location of the vehicle corresponds to a known location of a container to be serviced, can be used as a triggering condition to determine one or more images to be analyzed. Image(s) can be generated with a timestamp indicating the date and/or time when they were captured. The image(s) can also include metadata describing which camera generated each image. The timestamp and/or other metadata can be used to determine which image(s) are to be analyzed to identify any overages.

In some implementations, the onboard computing device 112 (e.g., UDU) collects sensor data 110 on an ongoing basis and/or periodically (e.g., every second, every 5 seconds, etc.), and the data is analyzed to determine whether a triggering condition is present. Image data 128 can also be generated and received on an ongoing basis, and a time window of image data can be retrieved and analyzed to determine overages, in response to detecting a triggering condition. For example, the time window of images from 5 seconds prior to the triggering condition up to the triggering condition can be analyzed to look for an overage. In some instances, the platform knows when a particular service event occurred, e.g., based on the sensor data 110 and/or location of the vehicle. That service event can be correlated to the image data that is being generated by the cameras. For example, a portion of the image data (including one or more images) within a time period prior to or including the time of the service event (e.g., 12 seconds prior to emptying a container) can be analyzed to capture image(s) of the container when it is still on the ground prior to being emptied. The image data can include any number of still images. In some implementations, the image data can include video data, such that the image(s) are frames of the video data.

In some implementations, the determination of a triggering condition can be further based on the location and/or movement of the vehicle. For example, a triggering condition can be determined based on the vehicle moving at less than a threshold speed (or decelerating to below a threshold speed) prior to the sensor data indicating a particular operational state of body components, and/or when the vehicle is within a threshold distance (e.g., within 10-15 feet) of a known location of a container to be handled. One or more images can be retrieved that visualize the container from that time, up to a time when the container is emptied (e.g., as determined based on the sensor data). Velocity, acceleration (or deceleration), and/or location of the vehicle can be based at least partly on information received from the vehicle's onboard systems, such as a GPS receiver and/or telematics sensor(s) describing the current speed, orientation, and/or location of the vehicle at one or more times.

In some implementations, the image(s) can be captured automatically by the cameras and stored (e.g., for a period of time) in the storage 116 of device 112. The particular image(s) from within the time period of interest (e.g., prior to emptying the can), based on the presence of the triggering condition, can be retrieved and analyzed automatically in response to detecting the triggering condition. In some implementations, the generation and/or retrieve of image(s) for analysis can be based at least partly on a command received from an operator. For example, a driver or other personnel present on the vehicle can push a button on, or otherwise issue a command to, the device 112, to request image capture when the vehicle is within suitable distance of the container to be handled.

In some implementations, the data to be uploaded to the device(s) 120 and/or device 148 can be packaged, in the signal(s) 146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the sensor data and/or location data can be analyzed on the device 112 to determine the presence of a triggering condition, and the particular image(s) (and/or video data) for the appropriate time period based on the triggering condition can be uploaded for analysis along with the corresponding time period of telemetry data, sensor data, and/or location data. In some instances, the data can be uploaded in real time with respect to the handling of the container, or the data can be uploaded in batches periodically. Data upload may be delayed until a suitable network connection is available between the onboard computing device 112 and the remote device(s) 120 and/or 148.

In some implementations, at least a portion of the analysis that is described herein as being performed on the analysis computing device(s) 120 and/or the output device(s) 148 can be performed by the onboard computing device 112 instead of or in addition to being performed on the analysis computing device(s) 120 and/or the output device(s) 148.

Figure 2A:
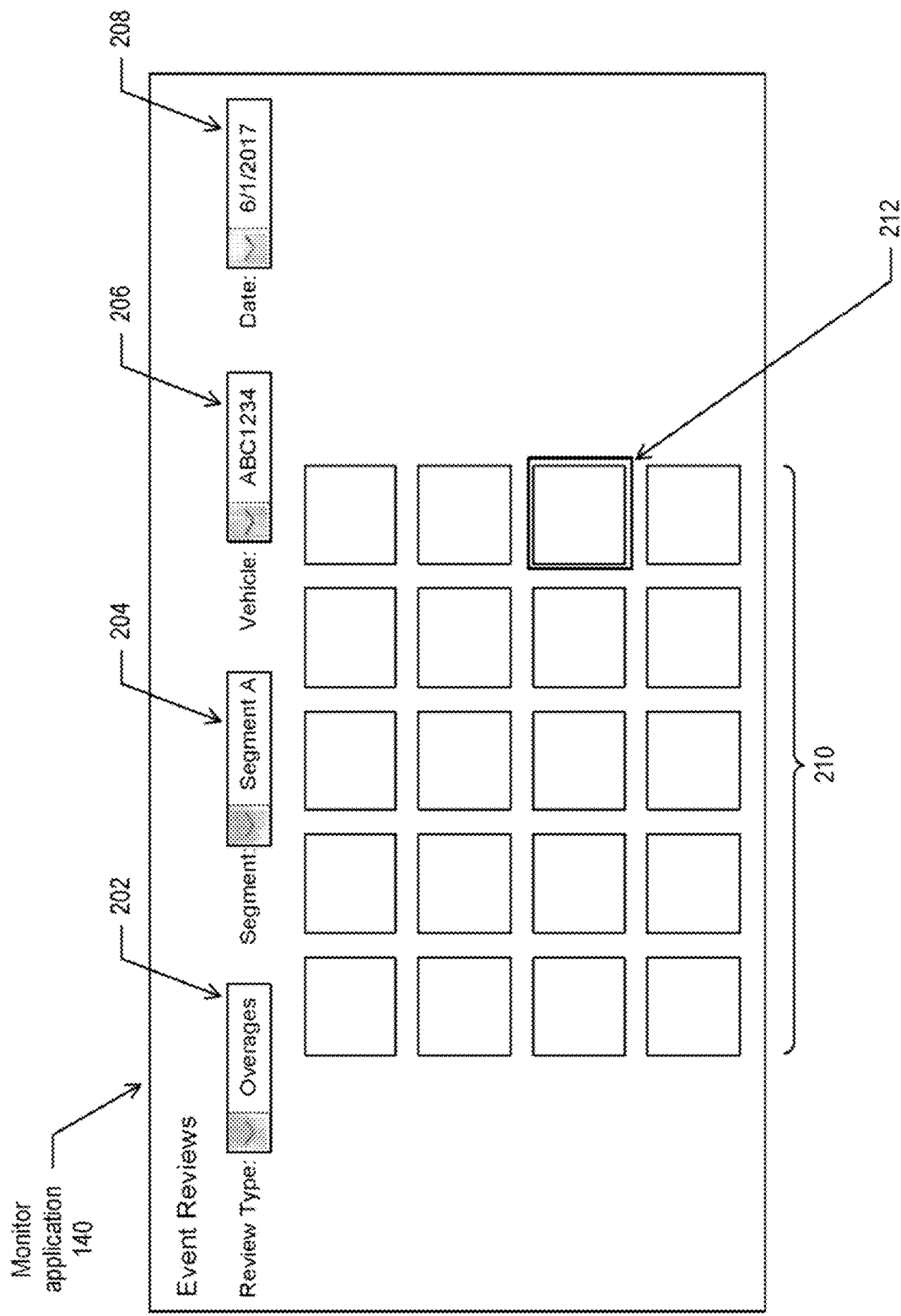

FIGS. 2A-2D illustrate example UIs for identifying container overage(s) and/or other issue(s), according to implementations of the present disclosure. In the example of FIG. 2A, the application 140 is presenting a UI 142 for image review by an operator. The UI can include a control 202 to allow the operator to select the type of review, such as a review to identify overages in containers as shown in the example. Other types of review can include reviewing images of containers to look for containers that are damaged, improperly positioned, or otherwise unsuitable for refuse collection handling. The UI can also include controls 204, 206, and/or 208 to respectively filter images based on a segment of an organization (e.g., a particular city or other area), the particular vehicle that generated the image data, and/or the date (or other time period) when the images were generated. A grid 210 can present a plurality of images that were captured, by cameras on one or more vehicles, during the vehicle(s)' route to collect refuse from containers. The operator can select one or more of the images to indicate that an overage is present, if the review type is "Overages." For other types of review, the selection of an image can indicate that the image exhibits the problem that is being reviewed for, such as repair issues, poorly positioned containers, and so forth.

Figure 2B:
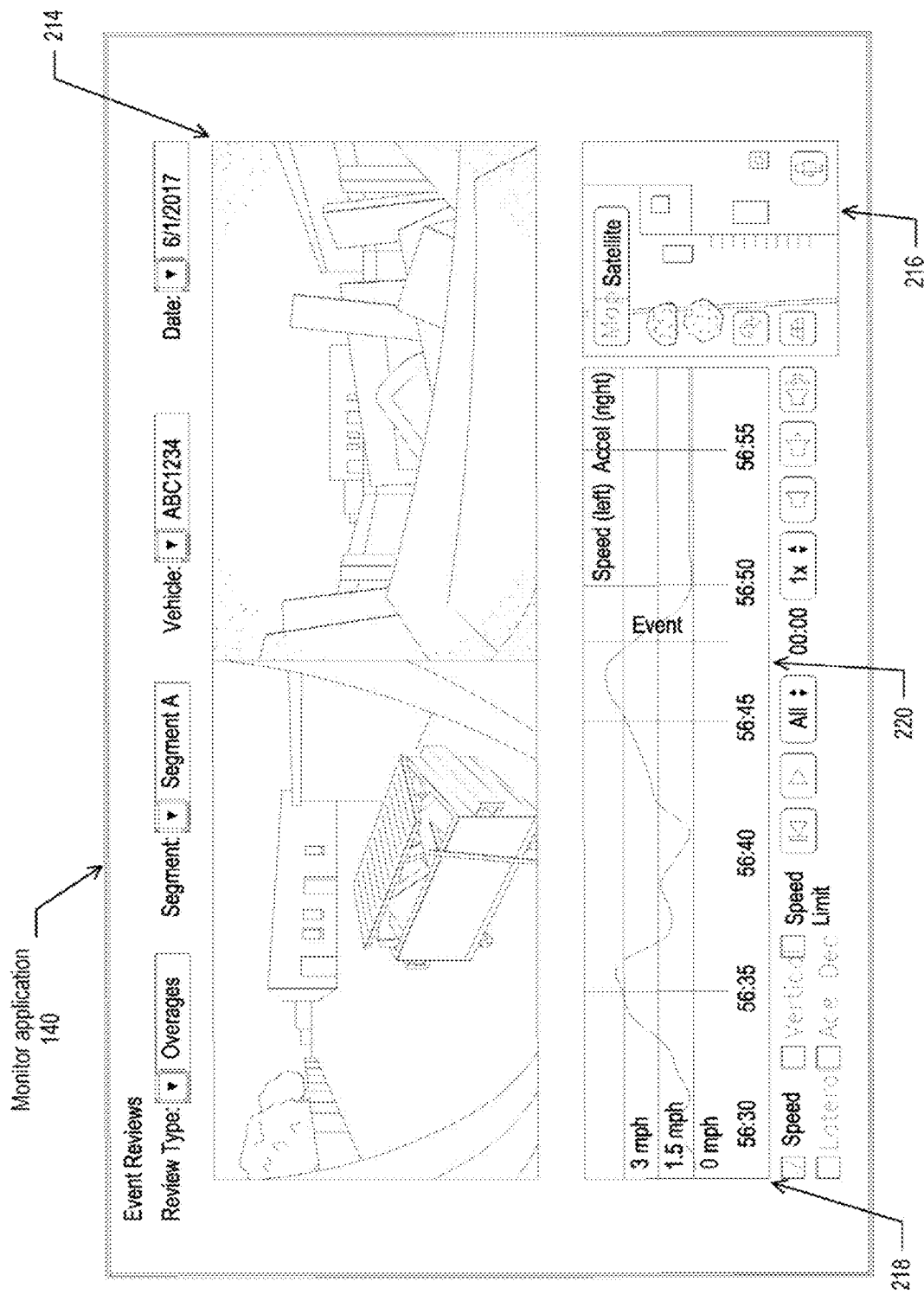

In some implementations, clicking on one of the images causes the UI to present a larger view of the image and/or more detail regarding the handling of the particular container shown in the image. For example, as shown in FIG. 2B, the UI can present a larger view of the image 214, a map 216 showing the location of the container (or the location of the vehicle when the image was captured), and a graph 218 showing a characteristic of the vehicle over time, during the time period proximal to handling the container. The displayed characteristic can be speed of the vehicle, as in the example shown, acceleration/deceleration, or some other characteristic. The graph can also show the point in time when the triggering condition was present (e.g., labeled "Event" in this example).

Figure 2C:
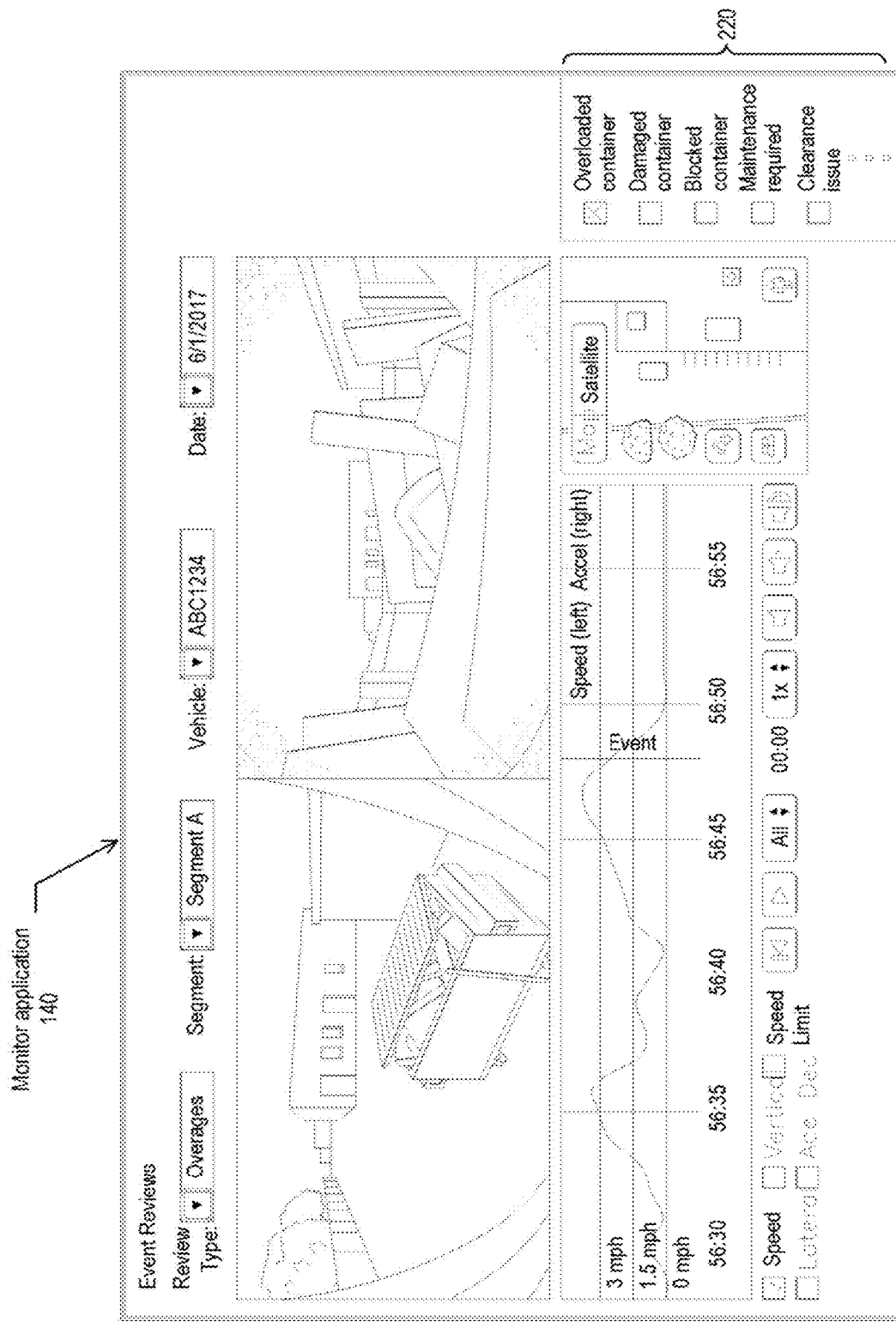

In some implementations, as shown in the example of FIG. 2C, the UI can present in the detailed view a list of checkboxes 220 or other suitable controls that allow the operator to select which conditions are exhibited by the container shown in the image, such as an overloaded container (e.g., overage), damaged container, blocked container, maintenance need, clearance issue (e.g., lack of suitable clearance for handling), and so forth.

The UI can also allow the operator to request the generation of a report that summarizes the results of the review of various container images. As shown in FIG. 2D, the report can include a list 222 of various events (e.g., images) that were analyzed. For each event, the report can list the event ID, the review type, the segment, the vehicle, the data and/or time (e.g., the timestamp of the image), the operator who is the reviewer, and a link to the more detailed display regarding the event. The report can also include additional and/or different information as appropriate.

In some implementations, the analysis of the image data to identify overages (or other issues), through the review application 140 and/or the engine 136, can be performed in real time with respect to the generation of the images (e.g., during the vehicle's route to collect refuse from the containers). In some implementations, the analysis can be performed at some time after the image(s) were generated and/or after the vehicle has completed its route.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

As described herein, the triggering condition can be one or more of the following: a particular operational state of a body component (e.g., a position of the lift arm in its cycle), a velocity (e.g., speed and/or direction of travel) of the vehicle, an acceleration or deceleration of the vehicle, a location of the vehicle, and/or other criteria. The presence of the triggering condition can cause the collection and/or analysis of the image data to identify overages or other issues present in one or more containers.

The application 140 can generate a report of overages or other issues. The application can also send signals that trigger action(s) to be performed, and/or perform the action (s) itself. Such action(s) can include a charge against an entity responsible for overloading the container (e.g., an overage fee). Action(s) can also include sending notification (s) to such entities and/or individuals responsible for administering the refuse collection vehicles, to notify the recipients of identified overages or other conditions exhibited by containers. The notifications can also include recommendations to correct the identified problems in the future, such as a recommendation to request additional container(s) and/or larger container(s) to handle the excess refuse, and/or more frequent pick-ups of refuse. The application 140 can provide additional information to the recipients of the notifications, to demonstrate the identified problem, including image(s) of the (e.g., overloaded) container(s), time, date, and/or location information, and so forth.

Figure 3:
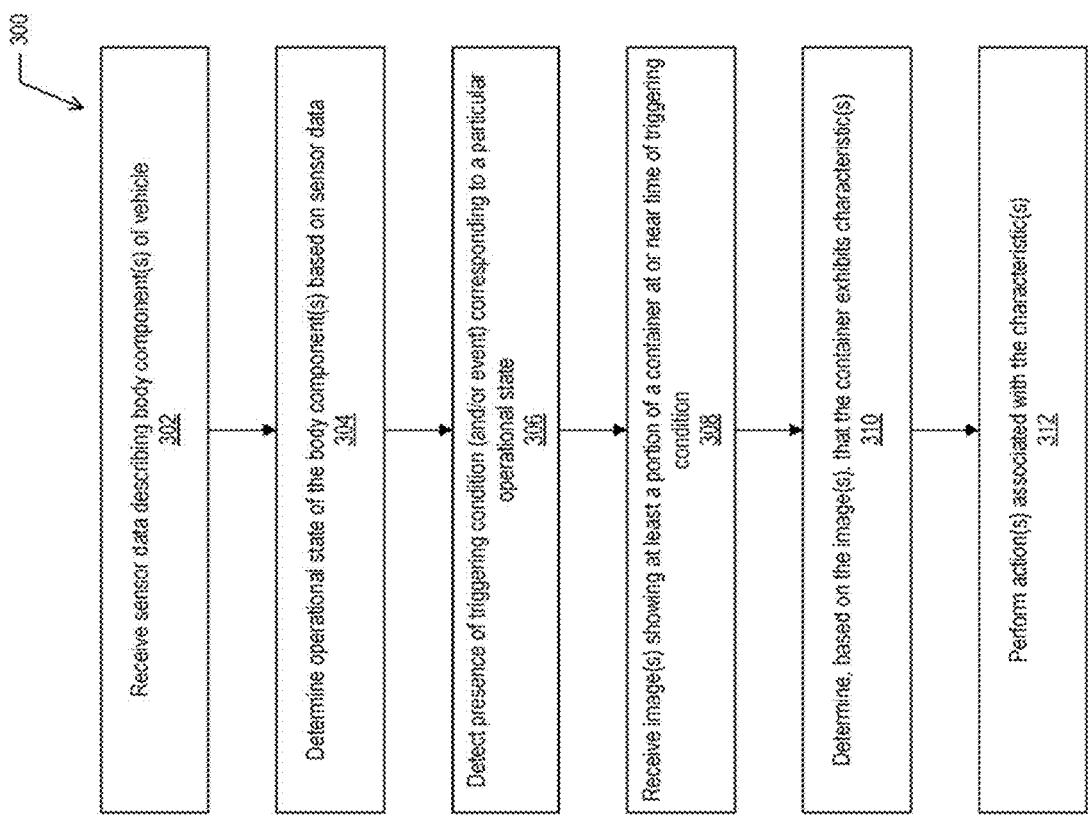
FIG. 3 illustrates a flow diagram of an example process for identifying characteristic(s), according to implementations of the present disclosure.

FIG. 3 illustrates a flow diagram of an example process for identifying container characteristic(s), such as overage(s) and/or other issue(s), according to implementations of the present disclosure. Operations of the process can be performed by one or more of the analysis module(s) 122, the classification engine 136, the monitor application 140, the UI 142, and/or other software module(s) executing on the onboard computing device 112, the analysis computing device(s) 120, the output device(s) 148, and/or elsewhere.

Sensor data is received (302), and the sensor data is analyzed to determine (304) an operational state and/or position of one or more body components of the vehicle. The presence of a triggering condition is detected (306) based at least partly on a particular operational state of the body component(s), such as the position of a lift arm at a particular point in its cycle to empty a container, a state of a grabber that is grabbing a container, and/or the opening of a hopper lid to receive emptied refuse into the hopper. As described above, the triggering condition can also be based at least partly on other information, such as the speed, deceleration, and/or location of the vehicle prior to handling a container. Image(s) are received (308) showing at least a portion of a container at or near the time of the triggering condition, such as a period of time (e.g., 10-15 seconds) prior to the triggering condition. Based on the image(s), a determination is made (310) whether the container exhibits particular characteristic(s), such as an overage. As described above, the determination can be performed by an image classification engine (e.g., through ML-based model application), and/or through an operator reviewing the image(s) in the application 140. One or more actions can be performed (312) based on the identified characteristic(s), such as an overage and/or other issue(s).

Figure 4A:
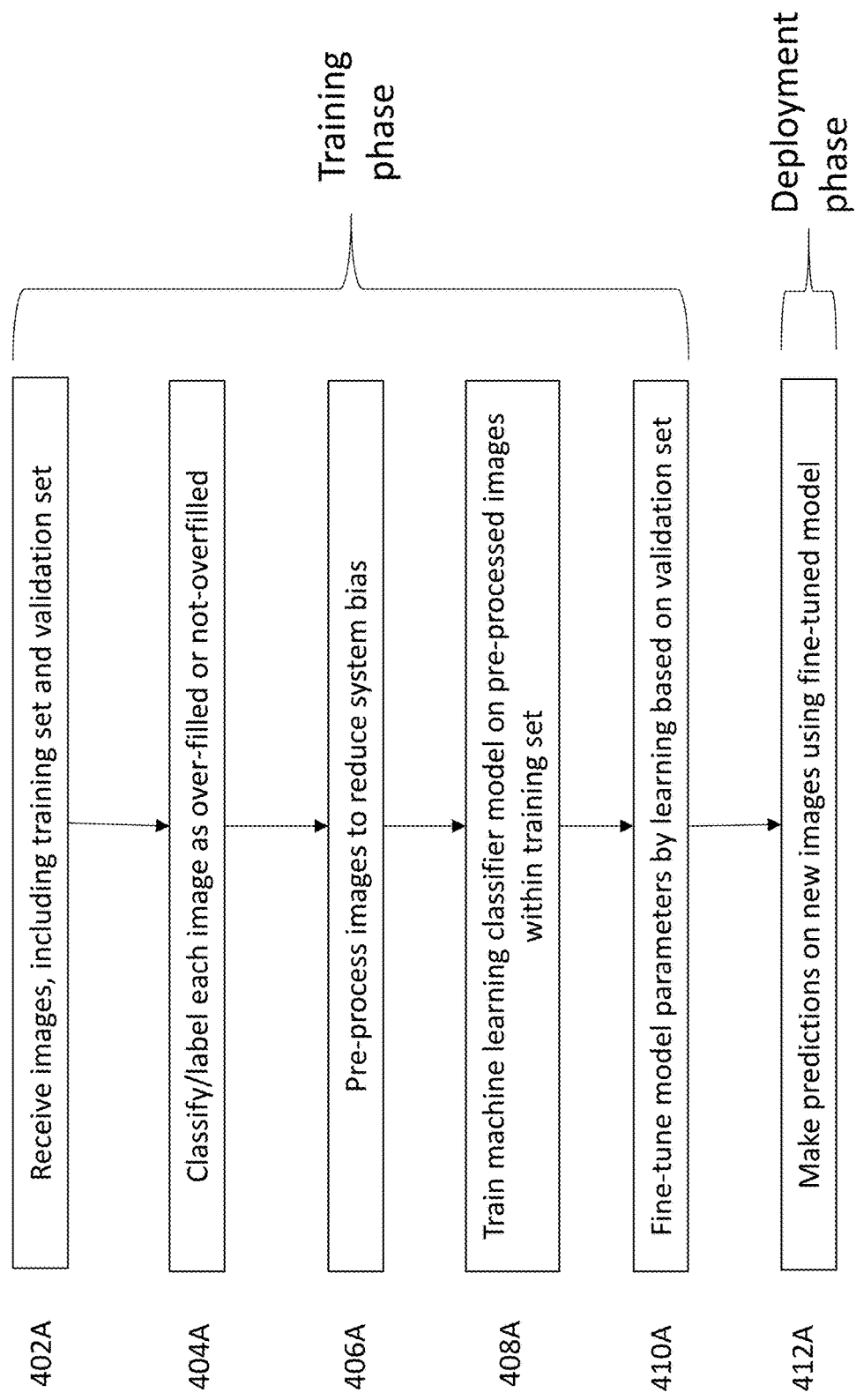

FIG. 4A illustrates one machine learning algorithm performed to identify container overage(s) and/or other issue (s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402A-410A describe the training phase of the machine learning model, and step 412A describes the deployment phase of the trained machine learning model to generate inferences.

The computing device 120 can receive, at 402A, images of containers from the RCV 102 as well as other RCVs. The received images can be divided into a first set of images, which can be referred to as a training set, and a second set of images, which can be referred to as a validation set (or a test set). The training set is a group of sample inputs to be fed into the machine learning model (e.g. neural network model) to train the model, and the validation set is a group of inputs and corresponding outputs that are used to determine the accuracy of the model when the model is being trained. While the images are described as being described as being received from several RCVs, in other implementations the images can be received from a single RCV (e.g. RCV 102).

In some implementations, the received images can be only those container images that are of containers that are similar in one or more characteristics to that of the container 130. These characteristics can include the shape of the container 130, the geographical location of the container, the type of building the container 130 is in, any other characteristic, and/or any combination thereof. The images can be in any format, such as JPEG, TIFF, GIF, BMP, PNG, any other image format, and/or any combination thereof.

Each of the received images can be classified, at 404A, in one of two classes: (1) image including an overfilled container, or (2) image not including an overfilled container. Such classification is also referred to as binary classification. In one implementation, the labeling of each image can be performed manually. In alternate implementations, the labeling of each image can be performed by the computing device 120 in an automated fashion. For example, the computing device 120 can implement an image processing algorithm to detect edges of the lid and base of the container that is configured to be adjacent to the lid if the container was empty and lid was fully closed; if the lid is distant from the nearest point of the base by more than a preset threshold the computing device 120 can presume that such image includes an overfilled container and can classify the image as including an overfilled container. Such edge detection can work by detecting discontinuities in brightness in the image, and can include any edge detection algorithm, such as Sobel, Canny, Prewitt, Roberts, and fuzzy logic methods. While edge detection is described as an image processing technique to determine whether the lid of the container is open, in other implementations the image processing can additionally or alternately include other techniques such as corner detection, ridge detection, blob detection, and/or the like.

The computing device 120 can pre-process, at 406A, each image to reduce system bias (i.e. bias of the machine learning model). As the received images have been labeled at 404, the actual output of the sample inputs (i.e. the received images) are known. The machine learning model may however generate a different output. The difference between the known correct output for the sample inputs and the actual output of the machine learning model is referred to as a training error. The purpose of the training of the machine learning model is to reduce the training error until the model produces an accurate prediction for the training set. A high bias means the model is not fitting well on the training set (i.e. the model is not producing an accurate-enough prediction for the training set). Pre-processing of the image reduces such bias so that the model fits well on the training set (i.e. the model produces an accurate-enough prediction for the training set). In some examples, the pre-processing steps include rotating, tilting, zooming, shearing, and/or the like of the received images, so as to make the machine learning model less biased towards the type or contents of the containers. The rotating, tilting, zooming, shearing, and/or the like of the received images can make the machine learning model less biased towards the type or contents of the containers because such actions train the model on wider variations of contents (e.g. tilted or rotated refuse container in varied photographic conditions due to different environmental conditions) in the images.

The computing device 120 can train, at 408A, the machine learning model using the pre-processed images within the training set. Training is the process of learning (i.e. determining) weights and bias values that the machine learning model should apply when inferences are made while minimizing the error (i.e. inaccuracy) in making predictions.

The computing device 120 can fine-tune (i.e. improve the accuracy of), at 410A, the parameters of the trained machine learning model by performing learning using the validation set. Such fine-tuning can also be referred to as optimization of the machine learning model. The fine-tuning (or optimization) can implement various optimization algorithms, such as gradient descent, stochastic gradient descent, mini-batch gradient descent, momentum, adaptive moment estimation (also referred to as Adam), and/or the like. The computing device 120 can implement an algorithm based on the computational aspects (e.g. computational architecture and structure) of the computing device 120. The gradient descent algorithm advantageously involves simple computations, and is easy to implement and easy to understand. The stochastic gradient descent algorithm advantageously involves frequent updates of model parameters and thus converges in less time, and requires less memory as there is no need to store values of loss functions. The mini-batch gradient descent algorithm advantageously frequently updates the model parameters, has less variance, and requires a medium amount of memory. The momentum algorithm advantageously reduces the oscillations and high variance of the parameters, and converges faster than gradient descent. The Adam algorithm advantageously is fast and converges rapidly, rectifies vanishing learning rate, and has a high variance.

Thus, in the training phase, a known data set is put through an untrained machine learning model (e.g. untrained neural network), the results are compared with known results of the data set, and the framework reevaluates the error value and updates the weight of the data set in the layers of the neural network based on accuracy of the value. This reevaulation advantageously adjusts the neural network to improve the performance of the specific task—i.e. classification task of classifying an image as including an overloaded container or not including an overloaded container—that the neural network is learning.

The computing device 120 can make, at 412A, predictions (which can also be referred to as inferences) on new images (e.g. one or more current images taken by an RCV 102) as to whether the container 130 in the new images is/was overloaded. Unlike the training phase, the deployment phase does not reevaulate or adjust the layers of the neural network based on the results, and instead the prediction applies knowledge from the trained neural network model and a uses that model to predict the result of whether the container 130 is overloaded. Therefore, when a new set of one or more images of the container 130 is input through the trained neural network, the neural network model outputs a prediction of whether the container 130 is overloaded based on predictive accuracy of the neural network.

Figure 4B:
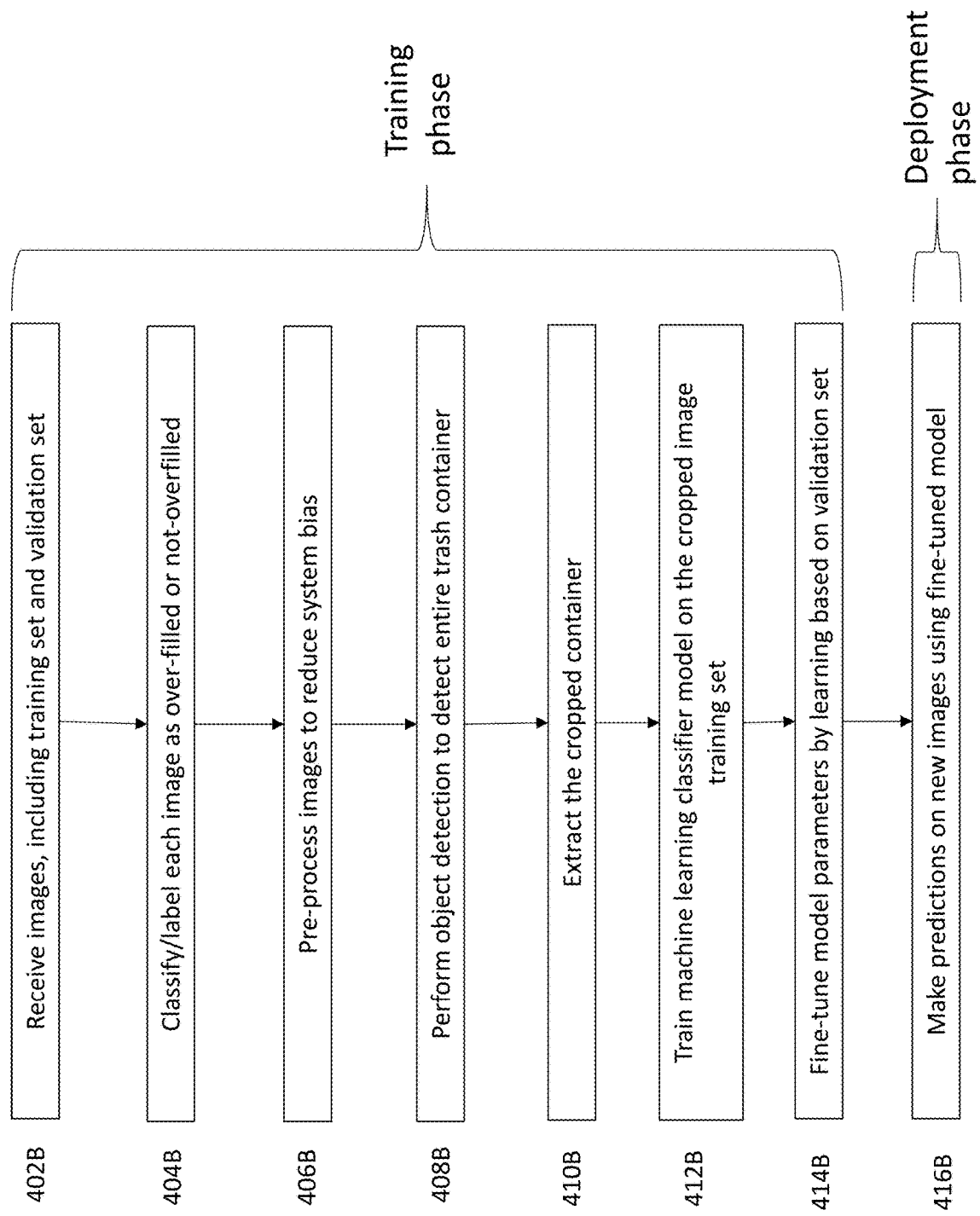

FIG. 4B illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402B-414B describe the training phase of the machine learning model, and step 4116B describes the deployment phase of the trained machine learning model to generate inferences. Steps 402B-406B can be same or similar to respective aspects of steps 402A-406A discussed above.

The computing device can perform, at 408B, object detection in each image to detect the container in each image. The computing device 120 can extract, at 410B, the container from each image. The object detection and extraction can be done by image processing algorithms that perform object detection to identify the container in the image, and then crop the identified container. In some implementations, object detection can be supplemented with other image processing techniques—such as edge detection, corner detection, ridge detection, blob detection, and/or the like—to expeditiously identify the container in each image.

The computing device 120 can train, at 412B, machine learning classifier model on the cropped image training set. As noted above, training is the process of learning (i.e. determining) weights and bias values that the machine learning model should apply when inferences are made while minimizing the error (i.e. inaccuracy) in making predictions. The steps 414B and 416B are same or similar to the above-discussed steps 410A and 412A, respectively.

Figure 4C:
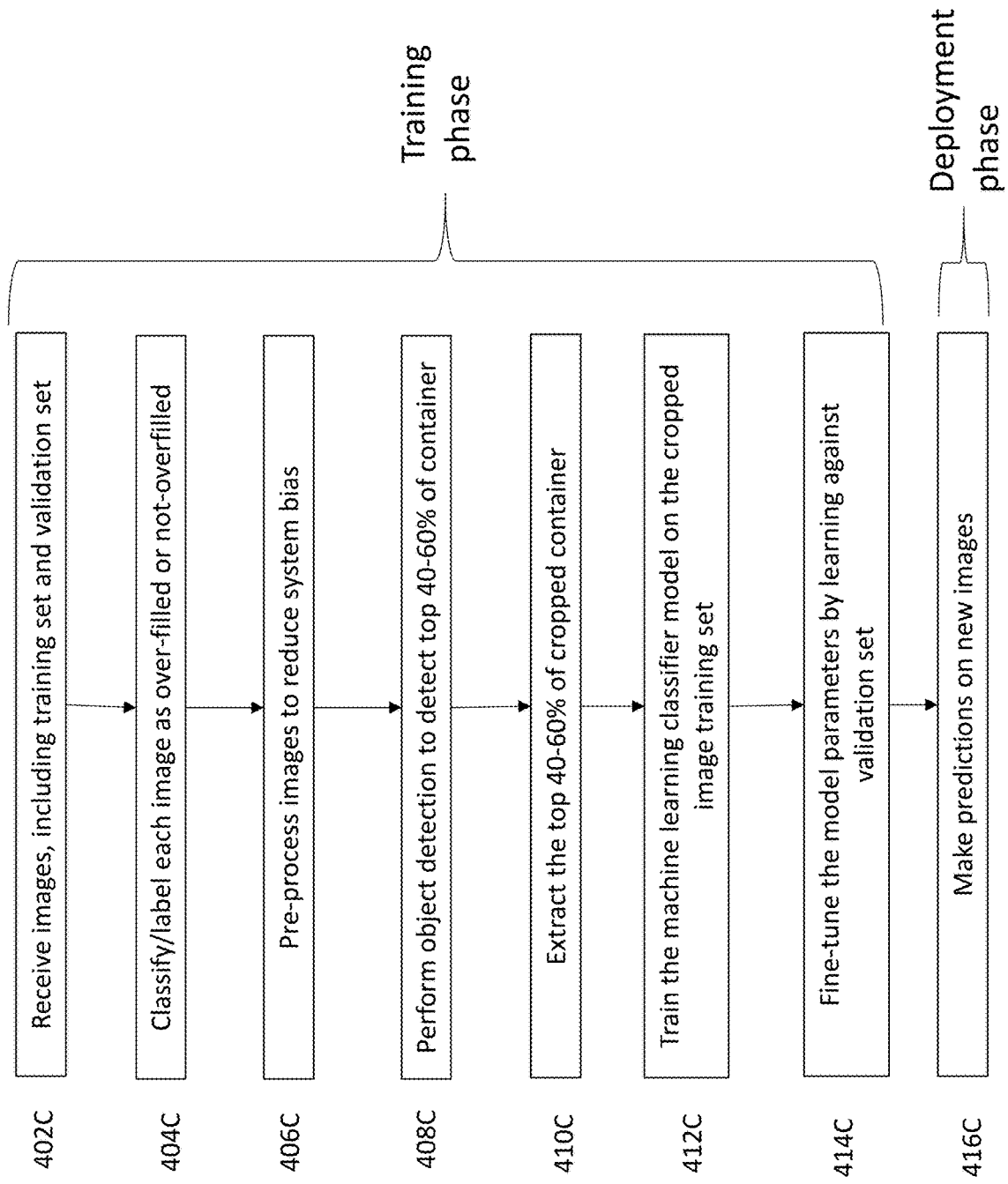

FIG. 4C illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402C-414C describe the training phase of the machine learning model, and step 416C describes the deployment phase of the trained machine learning model to generate inferences. Steps 402C-406C and 412C-416C can be same or similar to respective aspects of steps 402B-406B and 412B-416B discussed above.

In steps 408C and 410C, the top 40-60% of the container is cropped rather than the entire container, as used in steps 408B and 410B. Other than this distinction, the steps 408C and 410C are same or similar to steps 408B and 410B. The top 40-60% is appropriate because such proportion of the container shows whether the lid is partially open, which can indicate that the container is overfilled.

Figure 4D:
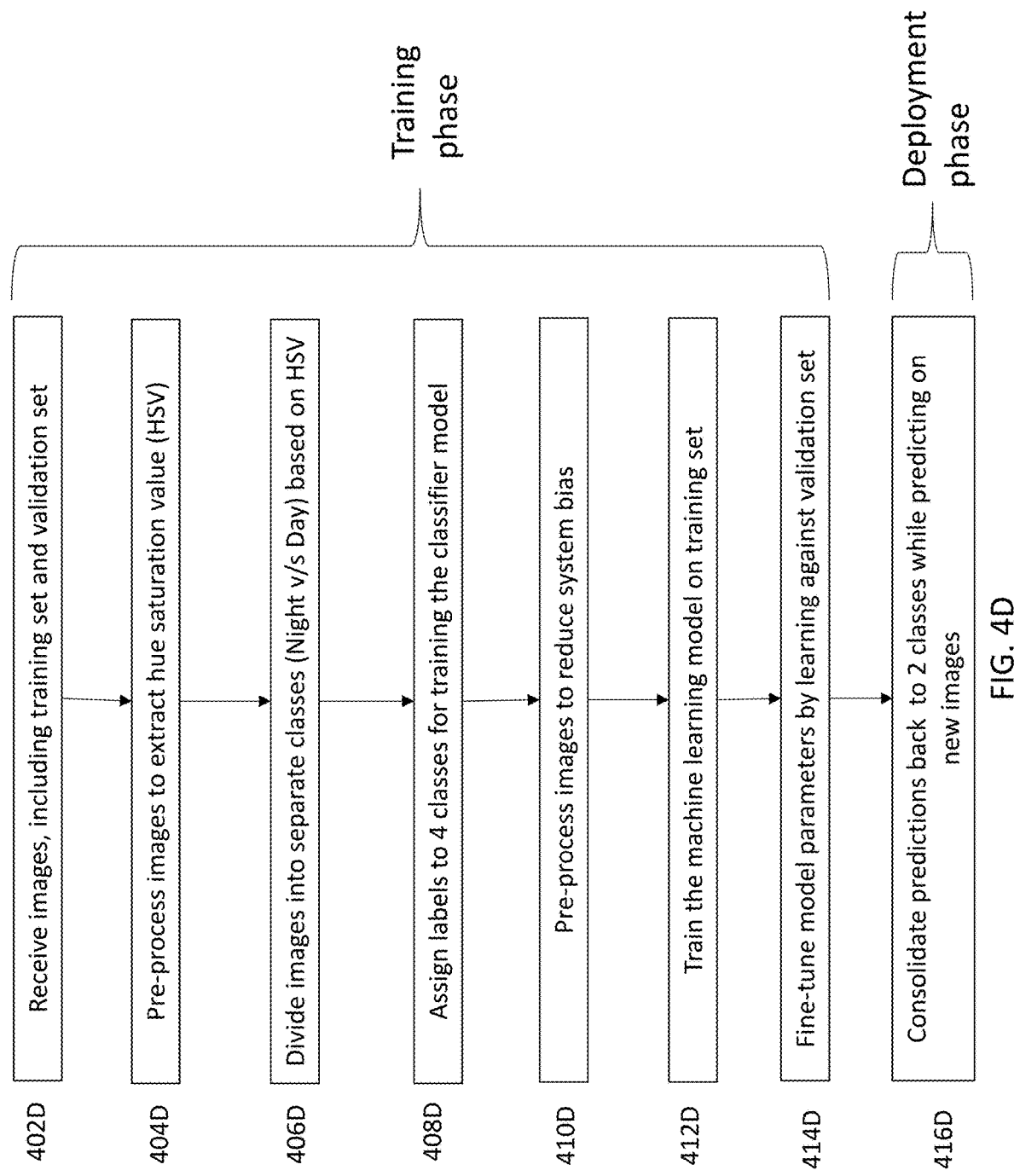

FIG. 4D illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402D-414D describe the training phase of the machine learning model, and step 416D describes the deployment phase of the trained machine learning model to generate inferences. Steps 402D and 410D-414D can be same or similar to respective aspects of corresponding steps discussed above.

The computing device 120 can pre-process, at 404D, images to extract (i.e. determine) hue saturation value (HSV) of each image. Hue represents color, saturation represents the amount to which that respective color is mixed with white, and value represents the amount to which that respective color is mixed with black. The determination of HSV is advantageous, as it enables an easier identification of objects—such as the container 130—in images obtained in various weather conditions, such as day, night, rain, snow, or any other weather condition. The pre-processing of an image can involve transforming image data in red green blue (RGB) format to image data in the HSV format.

The computing device 120 can divide, at 406D, the images in the HSV format into separate classes—such as those taken at night vs. those taken at day-based on the HSV data for each image. In other implementations where the number of images is small (e.g. less than 100), such division may be performed manually.

The computing device 120 can assign, at 408D, the images to four classes—overfilled at night, overfilled during day, not overfilled at night, not overfilled during day. These four classes are to be used to train the machine learning classifier model.

Once the machine learning model has been trained (pursuant to steps 410D-414D) and optimized, the computing device 120 can receive an input regarding the time when the container was emptied by the RCV, and then based on that input infer the time of the day (i.e. night vs. day) and generate, at 416D and based on the inferred time of the day, a prediction of whether a current or new image includes an overfilled container. This can also be referred to as consolidation, at 416D, of predictions back to two classes while predicting on new images.

FIG. 4E illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402E-414E describe the training phase of the machine learning model, and step 416E describes the deployment phase of the trained machine learning model to generate inferences. Steps 402E-416E are similar to steps 402D-416E, except that at 412E a separate model is trained based on day vs. night based on training set. Training separate models for day and night can be advantageous as images obtained during day can be different from those obtained at night. For example, images taken at night may have unique features—such as glare from headlights and darker background—that are not present or noticeable in images taken during the day.

Figure 4F:
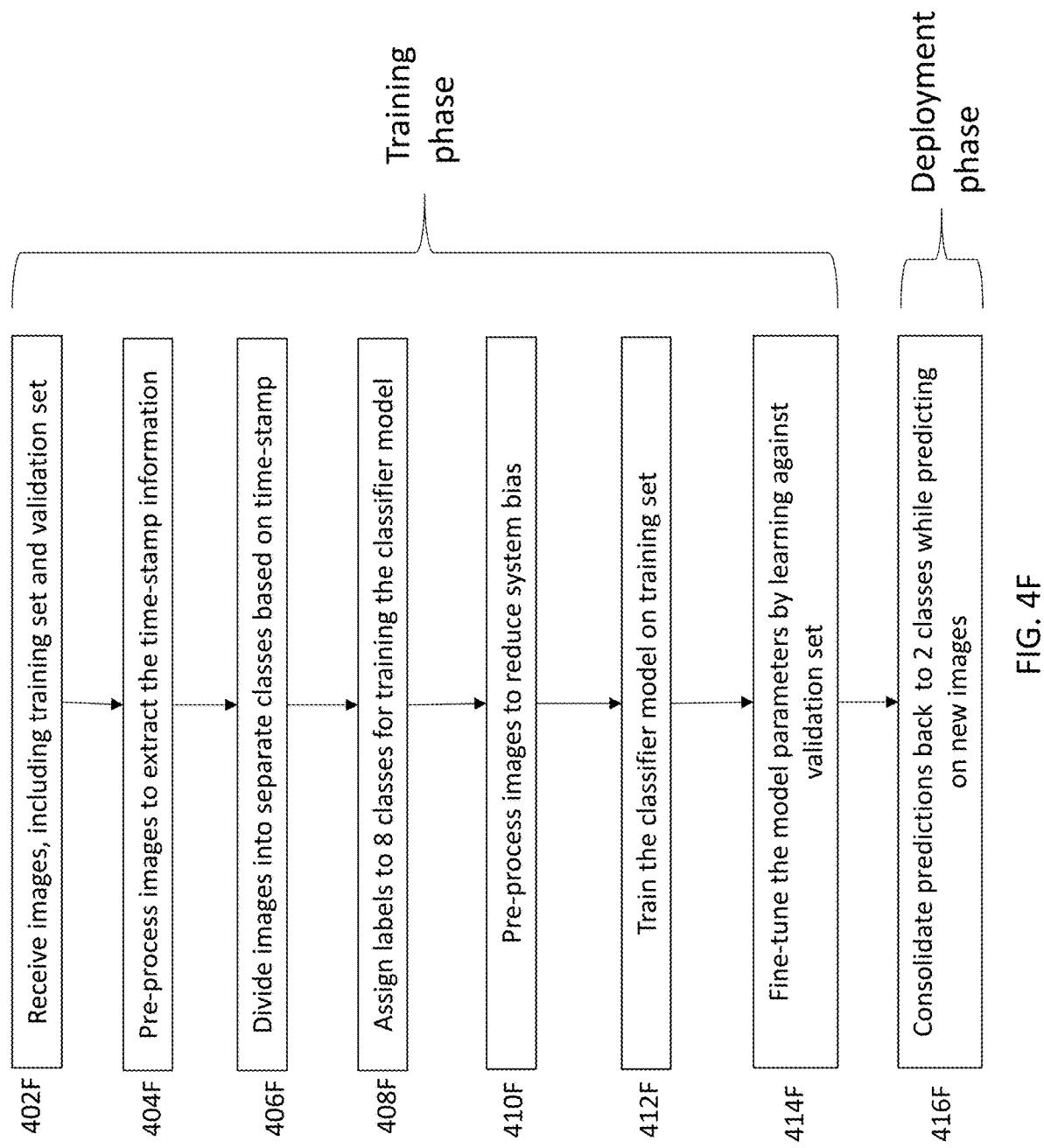

FIG. 4F illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402F-414F describe the training phase of the machine learning model, and step 416F describes the deployment phase of the trained machine learning model to generate inferences. Steps 402F and 410F-416F are similar to some of the steps noted above.

The computing device 120 can pre-process, at 404F, each image by extracting (e.g. determining) the time-stamp indicating a time when the image was obtained by the RCV. The computing device 120 can divide, at 406F, the images into separate classes based on the time-stamps. In one example, the number of classes can be eight. While eight classes are described, in other implementations the images can be divided into any other number of classes. The computing device 120 can assign, at 408F, labels to eight classes (or any other number of classes as noted above) based on the time-stamps for the images. Other steps are similar to those noted above. In other implementations, the dividing at 406F and/or the assigning at 408F can be performed manually when the number of images is small (e.g. less than 100).

Figure 4G:
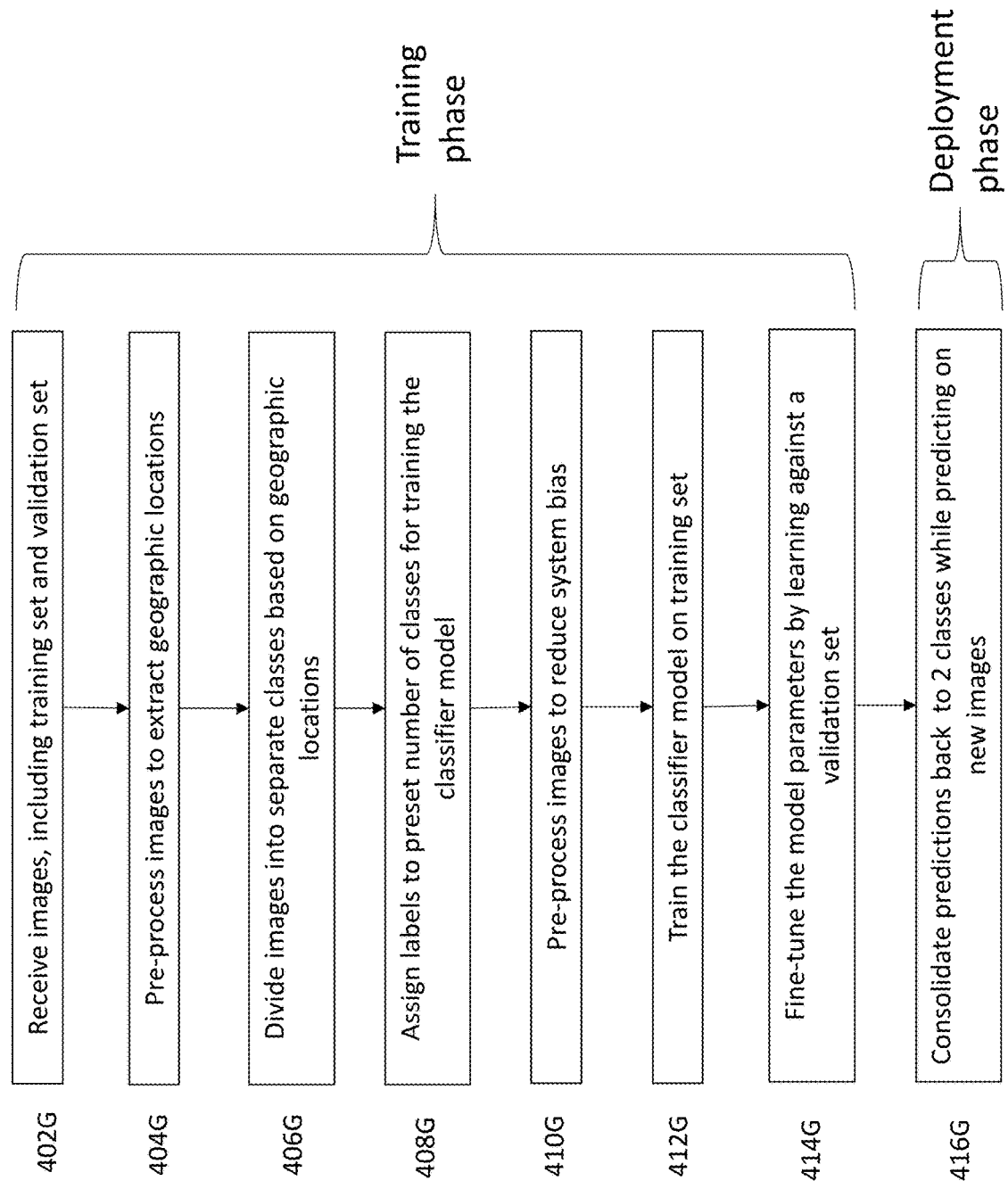

FIG. 4G illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402G-414G describe the training phase of the machine learning model, and step 416G describes the deployment phase of the trained machine learning model to generate inferences. Steps 402G-416G are similar to the steps in FIG. 4F, except that the pre-processing at 404G and dividing at 406G is associated with geographic location where each image is captured by the corresponding RCV (as opposed to being associated with time-stamp information of each image, as noted in FIG. 4F).

Figure 4H:
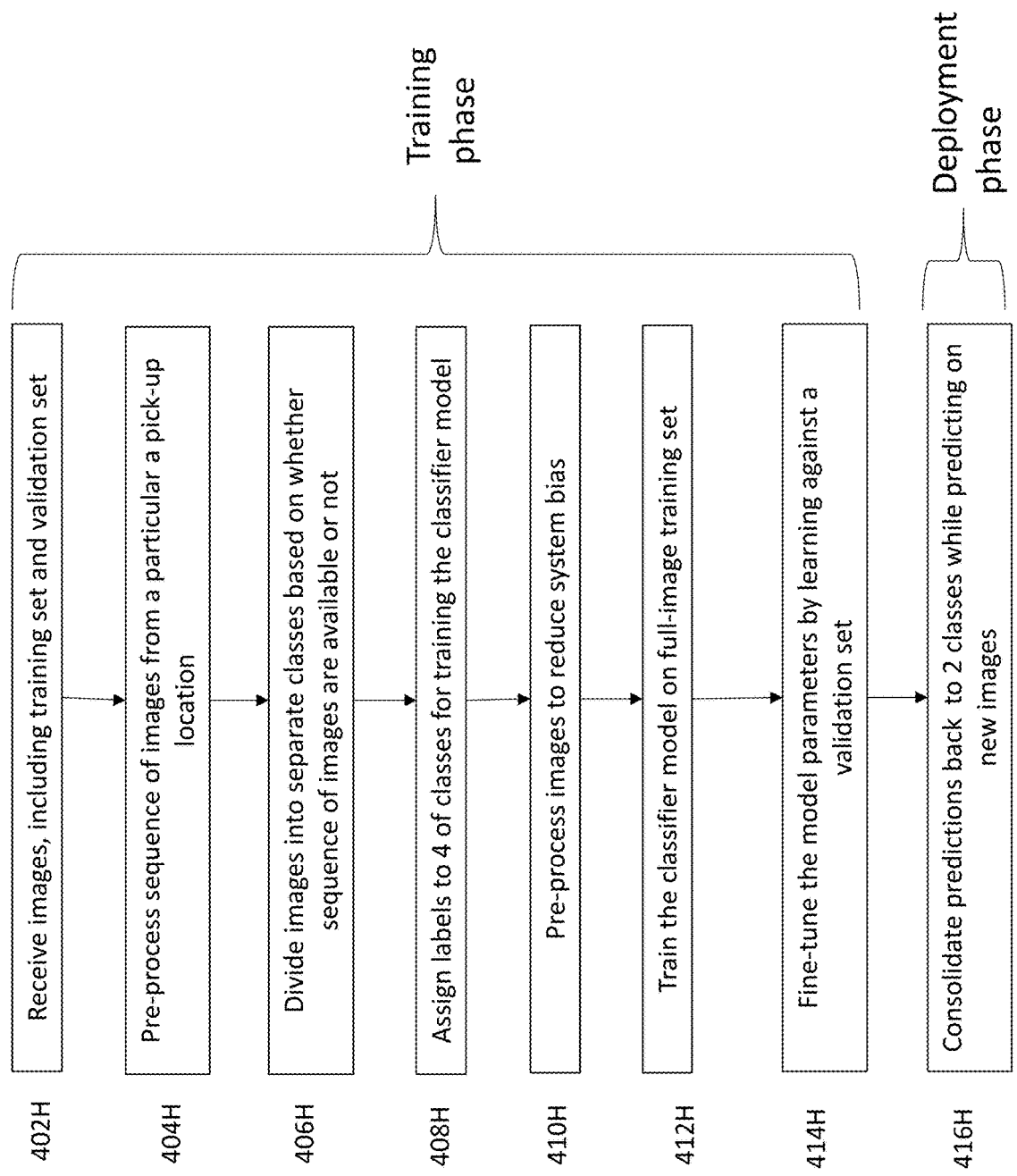

FIG. 4H illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402H-414H describe the training phase of the machine learning model, and step 416H describes the deployment phase of the trained machine learning model to generate inferences. Various aspects of steps 402H-416H are similar to the steps noted above. In this algorithm, the pre-processing at 404H of sequence of images—or a video stream—from a particular pick-up location is to train the classifier to better detect—whether the container is overfilled—as the RCV approaches the container. One example of eight different classes for steps 406H and 408H can be:

(1) Overfilled Images belonging to images clicked between (12 am-8 am)

(2) Overfilled Images belonging to images clicked between (8 am-2 pm)

(3) Overfilled Images belonging to images clicked between (2 pm-7 pm)

(4) Overfilled Images belonging to images clicked between (7 am-12 am)

(5) Not-overfilled Images belonging to images clicked between (12 am-8 am)

(6) Not-overfilled Images belonging to images clicked between (8 am-2 pm)

(7) Not-overfilled Images belonging to images clicked between (2 pm-7 pm)

(8) Not-overfilled Images belonging to images clicked between (7 am-12 am)

Figure 4I:
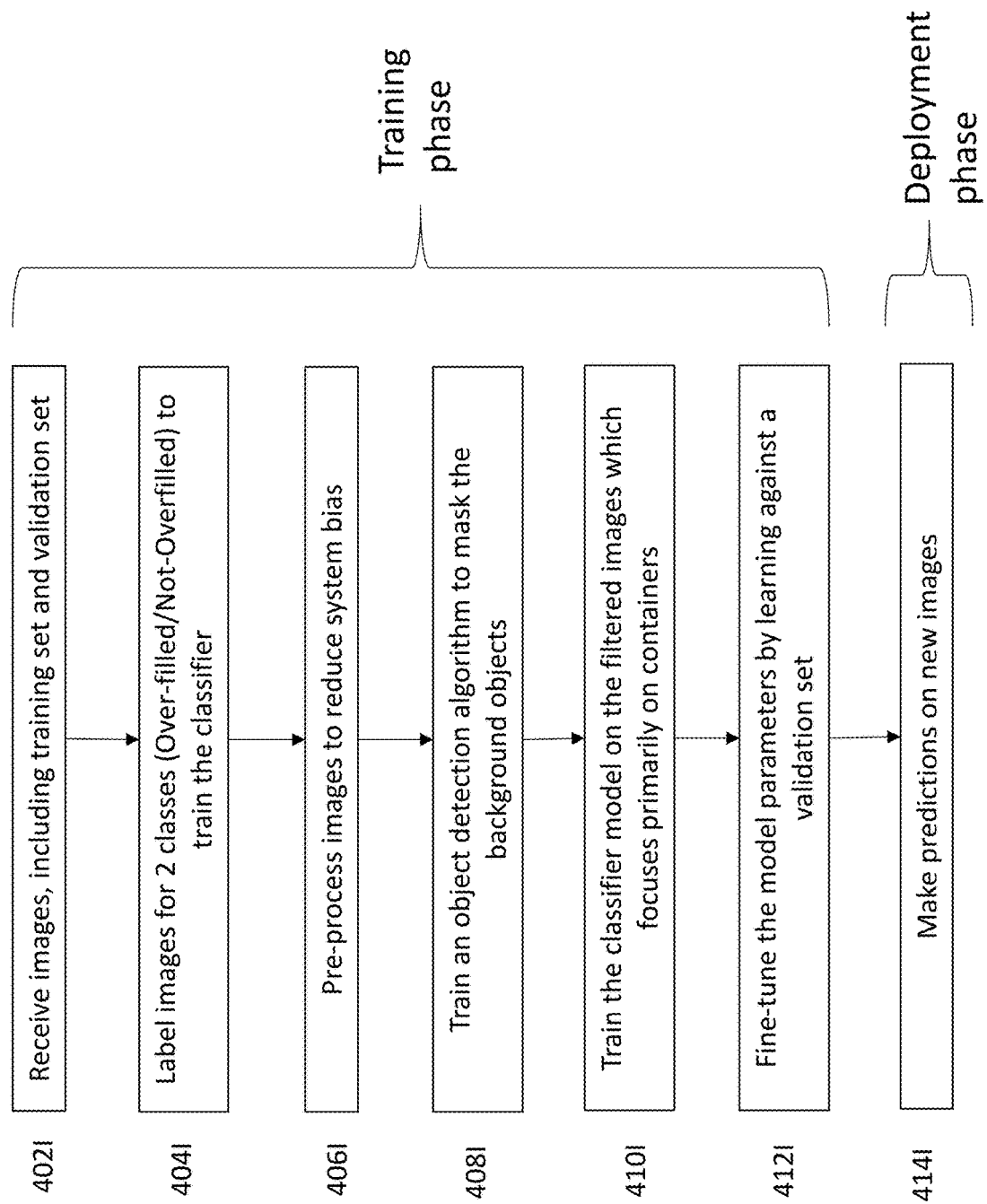

FIG. 4I illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402I-412I describe the training phase of the machine learning model, and step 414I describes the deployment phase of the trained machine learning model to generate inferences. Various aspects of steps 402I-414I are similar to the steps noted above. The background objects referenced at 408I can include humans, hard-hats, wipers, trees, and/or the like. The background objects can be masked using one or more techniques, such as layer masking, clipping mask, alpha channel masking, any other one or more masking techniques, and/or any combination thereof.

FIG. 4J illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402J-412J describe the training phase of the machine learning model, and step 414J describes the deployment phase of the trained machine learning model to generate inferences. Various aspects of steps 402J-414J are similar to the steps noted above. The pre-processing, at 404J, to remove glare may be performed using histogram equalization techniques. Histogram equalization is a technique for adjusting image intensities to vary contrast.

Figure 4K:
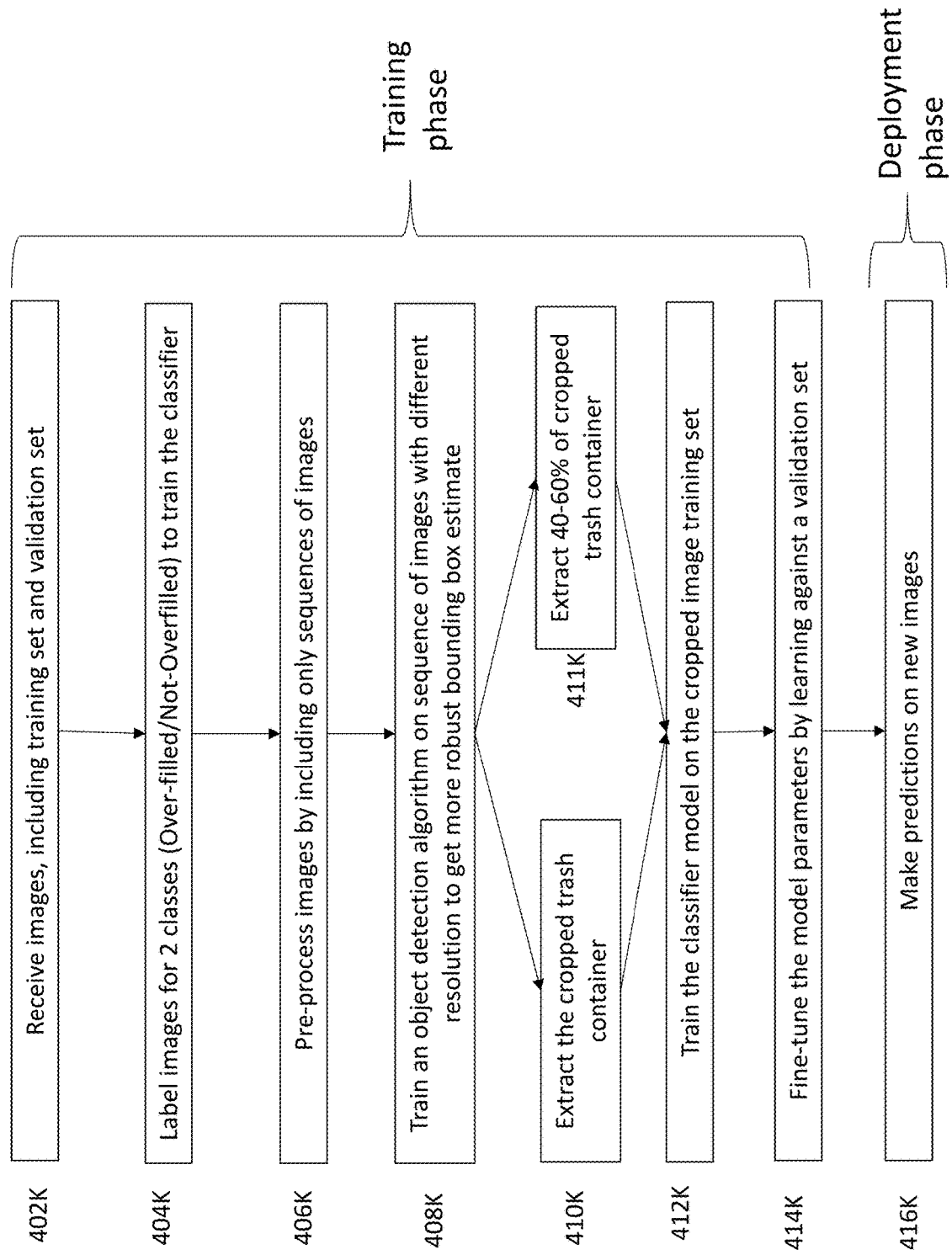

FIG. 4K illustrates another machine learning algorithm performed to identify container overage(s) and/or other issue(s), according to implementations of the present disclosure. The computing device 120 can first train the machine learning model using various images of the container 130 and/or similar containers, and then can deploy the trained machine learning model to generate inferences that indicate whether the container 130 is overfilled or there are other issues. Steps 402K-414K describe the training phase of the machine learning model, and step 416H describes the deployment phase of the trained machine learning model to generate inferences. Various aspects of steps 402K-416K are similar to the steps noted above.

In this algorithm, the moving RSV that is slowing down in front of the container 130 records a video, which can include a sequence of images, which are pre-processed at 406K. In some implementations, the sequence of images can be a video stream. Training at 408K on sampled sequences of such images, with different resolutions, can enable better recognition of the type, depth and shape of objects in the image. In the case of overfilled bin, training on a sequence of images allows enhanced accuracy in identifying the container even at different resolutions and determining whether the container was overfilled. This reduces the workload on the classification model by feeding into the model a more accurate bounding box (i.e. cropped image). In some implementations, the cropping can be top 40-60% of the container, as is described above.

The machine learning techniques described herein can be implemented on at least one computing processor (e.g. cloud computing server) and/or at least one hardware accelerator (e.g. edge) coupled to that at least one computing processor. While the machine learning techniques described above have been focused on refuse collection, in other implementations, the techniques and modeling described herein can be implemented by other companies that collect or fill containers, such as gas or oil dispensing companies, pesticide dispensing companies, or the like. For example, a gas or oil dispensing company that provides gas or oil to gas stations can deploy models trained on images of oil or gas collection containers to infer whether a particular (e.g. current or most recent) oil or gas container is under-filled or overfilled. Determination of under-filled containers can help with accounting and supply chain requirements, while identification of overfilled containers can raise a timely alarm of a potential hazard. In yet another example, a pesticide dispensing company can deploy models trained on images of pesticide containers to infer whether a particular (e.g. current or most recent) pesticide container is under-filled or overfilled.

In additional or alternate implementations, machine learning models can be trained and used to determine, at a site where the vehicle is emptying or filling a container, any obstructions (e.g. objects, plants, humans, construction, vehicles, and/or any other obstruction), safety concerns (e.g. physical, environmental, etc.), anything that would hamper a drivers ability to expediently perform the needed tasks, and/or the like in a pre-determined average time frame window.

In some implementations, machine learning models can be trained and used to determine, during a loading or unloading process by a vehicle, any unusual or unexpected occurrence during the emptying or filling process (e.g., operator's performance outside expected routine parameters, an inadvertent hose disconnection, spill, and/or the like when the vehicle is filling-in gas or oil in containers at gas stations).

In a few implementations, the training of machine learning models can involve mapping a site where a vehicle empties or fills a container. In the deployment phase, in all future site visits by a vehicle, the site's map can be compared to a map generated during the emptying or filling of the container and such comparison can be used to determine whether there is any impropriety (e.g. one or more of improper objects, improper processes, and/or the like) during the emptying or filling. In some implementations, the training phase can further include modeling based on type of product (e.g. diesel, high grade gasoline, low grade gasoline, etc.) being used to fill the container, so that the deployment phase can invoke models specific to the type of product being emptied or filled.

Figure 5:
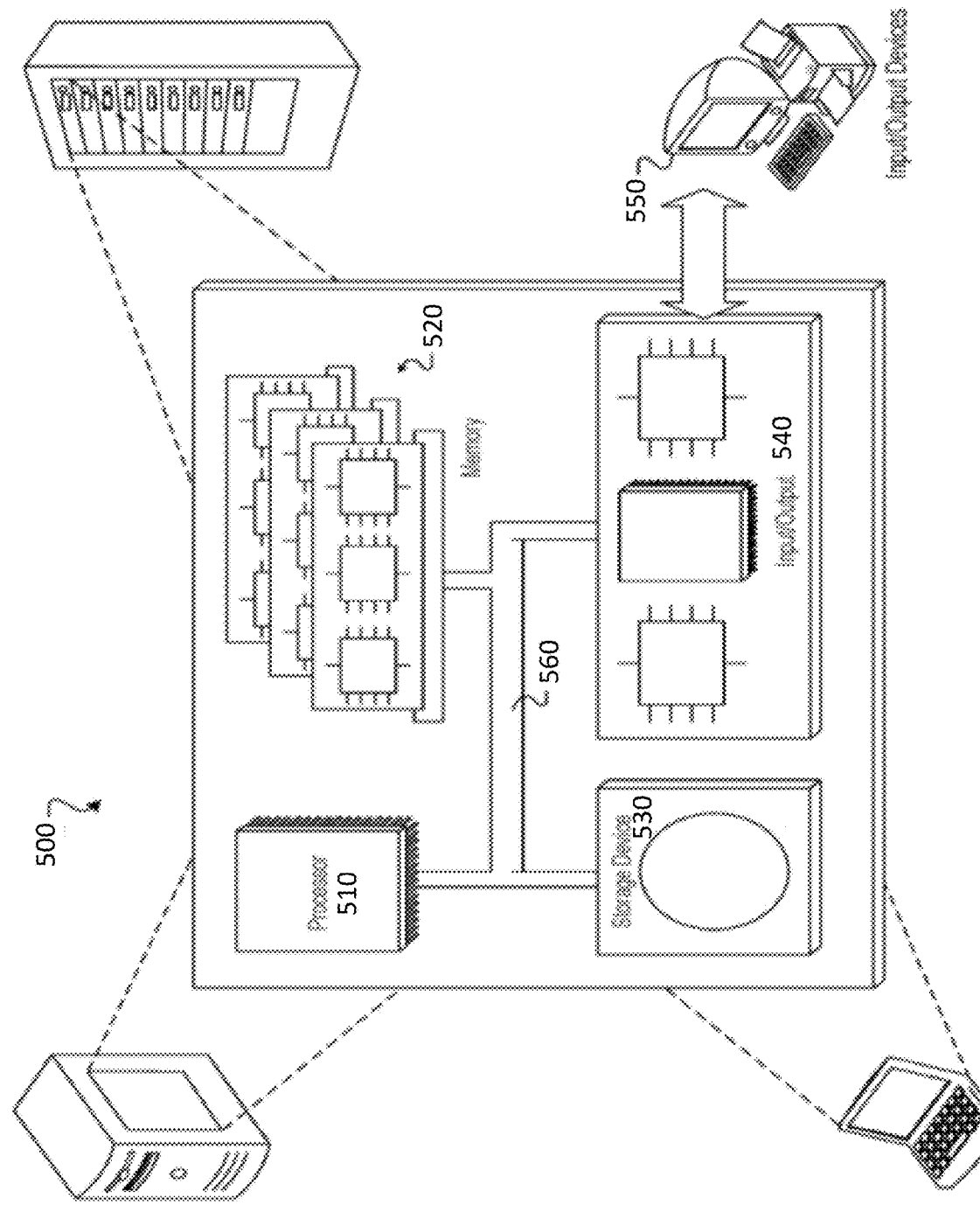
FIG. 5 illustrates an example computing system, according to implementations of the present disclosure.

FIG. 5 illustrates an example computing system, according to implementations of the present disclosure. The system 500 may be used for any of the operations described with respect to the various implementations discussed herein. For example, the system 500 may be included, at least in part, in one or more of the onboard computing device 112, the analysis computing device(s) 120, the output device(s) 148, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. Wireless network(s) can include, for example, network(s) that employ any suitable version of a Bluetooth™ standard or other suitable wireless networking standard(s). In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A method comprising:
receiving, by one or more processors, a plurality of images of one or more containers while the one or more containers are being emptied, the plurality of images comprising a training set of images and a validation set of images;
pre-processing, by the one or more processors, the plurality of images to extract hue saturation value (HSV) scale for the plurality of images;
dividing, by the one or more processors and based on the HSV scale, the plurality of images into different sets of images within the plurality of images;
labeling, by the one or more processors, [i] each image of the plurality of images according to the different sets, and [ii] each image of the plurality of images as including either an overfilled container or a not-overfilled container;
processing, by the one or more processors, each image of the plurality of images to reduce bias of a machine learning model;
training, by the one or more processors and based on the labeling, the machine learning model using the plurality of labeled images; and
optimizing, by the one or more processors, the machine learning model by performing learning against the validation set, the optimized machine learning model being used to generate a prediction for a new image of a container, the prediction indicating whether the container in the new image was overfilled prior to the new container being emptied.

2. The method of claim 1, further comprising:
performing, by the one or more processors and subsequent to the processing, object detection on each image of the plurality of images to identify a respective container within the plurality of images; and
cropping, by the one or more processors, each image of the plurality of images to extract a portion of the image with the respective identified container,
wherein the training of the machine learning model is performed using the images after the cropping has been performed.

3. The method of claim 1, further comprising:
performing, by the one or more processors and subsequent to the processing, object detection on each image of the plurality of images to identify top 40-60% of a respective container within the plurality of images; and
cropping, by the one or more processors, each image of the plurality of images to extract a portion of the image with the top 40-60% of the respective identified container,
wherein the training of the machine learning model is performed using the images after the cropping has been performed.

4. The method of claim 1, wherein the different sets of images comprise a first set with images obtained during day and a second set with images obtained during night.

5. The method of claim 1, wherein each of the different sets of images include images with different corresponding time-stamps, each time-stamp indicating a time when a respective image was obtained by a corresponding vehicle.

6. The method of claim 1, further comprising:
pre-processing, by the one or more processors, the plurality of images to determine geographic locations where the plurality of images were obtained; and
wherein:
the labeling further comprises labeling the plurality of images according to the geographic locations; and
the training of the machine learning model is based on the labeled images.

7. The method of claim 1, wherein:
while a particular container of the one or more containers is being emptied, a sequence of images among the plurality of images are obtained from one or more vehicles; and
the training is performed using the sequence of images.

8. The method of claim 7, wherein the sequence of images is a video stream.

9. The method of claim 1, further comprising:
performing, by the one or more processors, object detection on each image of the plurality of images to identify a respective container within the plurality of images; and
masking, by the one or more processors, other objects in the plurality of images,
wherein the training of the machine learning model is performed using the images after the masking has been performed.

10. The method of claim 1, wherein the processing further comprises:
reducing, by the one or more processors, at least one of glare from headlights or brightness due to sunlight in each image of the plurality of images.

11. A non-transitory computer program product storing instructions that, when executed by at least one programmable processor, cause the at least one programmable processor to perform operations comprising:
receiving a plurality of images of one or more containers while the one or more containers are being emptied, the plurality of images comprising a training set of images and a validation set of images;
pre-processing the plurality of images to extract hue saturation value (HSV) scale for the plurality of images;
dividing, based on the HSV scale, the plurality of images into different sets of images within the plurality of images;
labeling [i] each image of the plurality of images according to the different sets, and [ii] each image of the plurality of images as including either an overfilled container or a not-overfilled container;
processing each image of the plurality of images to reduce bias of a machine learning model;

training, based on the labeling, the machine learning model using the plurality of labeled images; and optimizing the machine learning model by performing learning against the validation set, the optimized machine learning model being used to generate a prediction for a new image of a container, the prediction indicating whether the container in the new image was overfilled prior to the container being emptied.

12. A system comprising:
at least one programmable processor; and
a machine-readable medium storing instructions that, when executed by the at least one processor, cause the at least one programmable processor to perform operations comprising:
  receiving a plurality of images of one or more containers while the one or more containers are being emptied, the plurality of images comprising a training set of images and a validation set of images;
  pre-processing the plurality of images to extract hue saturation value (HSV) scale for the plurality of images;
  dividing, based on the HSV scale, the plurality of images into different sets of images within the plurality of images;
  labeling [i] each image of the plurality of images according to the different sets, and [ii] each image of the plurality of images as including either an overfilled container or a not-overfilled container;
  processing each image of the plurality of images to reduce bias of a machine learning model;
  training, based on the labeling, the machine learning model using the plurality of labeled images; and
  optimizing the machine learning model by performing learning against the validation set, the optimized machine learning model being used to generate a prediction for a new image of a container, the prediction indicating whether the container in the image was overfilled prior to the container being emptied.

13. An article of manufacture comprising computer executable instructions stored on non-transitory computer readable media, which, when executed by a computer, causes the computer to perform operations comprising:
  receiving a plurality of images of one or more containers while the one or more containers are being emptied, the plurality of images comprising a training set of images and a validation set of images;
  pre-processing the plurality of images to extract hue saturation value (HSV) scale for the plurality of images;
  dividing, based on the HSV scale, the plurality of images into different sets of images within the plurality of images;
  labeling [i] each image of the plurality of images according to the different sets, and [ii] each image of the plurality of images as including either an overfilled container or a not-overfilled container;
  processing each image of the plurality of images to reduce bias of a machine learning model;
  training, based on the labeling, the machine learning model using the plurality of labeled images; and
  optimizing the machine learning model by performing learning against the validation set, the optimized machine learning model being used to generate a prediction for a new image of a container, the prediction indicating whether the container in the new image was overfilled prior to the new container being emptied.

14. The method of claim 1, further comprising:
assigning each of the plurality of images to one of a plurality of classes, wherein each class of the plurality of classes is associated with a respective set of the different sets, wherein:
  the labeling further comprises labeling the plurality of images according to the plurality of classes, and
  the training of the machine learning model is based on the labeled images.

15. The non-transitory computer program product of claim 11, wherein the operations further comprise:
assigning each of the plurality of images to one of a plurality of classes, wherein each class of the plurality of classes is associated with a respective set of the different sets, wherein:
  the labeling further comprises labeling the plurality of images according to the plurality of classes, and
  the training of the machine learning model is based on the labeled images.

16. The system of claim 12, wherein the operations further comprise:
assigning each of the plurality of images to one of a plurality of classes, wherein each class of the plurality of classes is associated with a respective set of the different sets, wherein:
  the labeling further comprises labeling the plurality of images according to the plurality of classes, and
  the training of the machine learning model is based on the labeled images.

17. The article of manufacture of claim 13, wherein the operations further comprise:
assigning each of the plurality of images to one of a plurality of classes, wherein each class of the plurality of classes is associated with a respective set of the different sets, wherein:
  the labeling further comprises labeling the plurality of images according to the plurality of classes, and
  the training of the machine learning model is based on the labeled images.

* * * * *

UNITED STATES PATENT AND TRADEMARK OFFICE
CERTIFICATE OF CORRECTION

| | | |
|---|---|---|
| PATENT NO. | : 11,615,275 B2 | Page 1 of 1 |
| APPLICATION NO. | : 17/204569 | |
| DATED | : March 28, 2023 | |
| INVENTOR(S) | : Prem Swaroop, Atish P. Kamble and Bodhayan Dev | |

It is certified that error appears in the above-identified patent and that said Letters Patent is hereby corrected as shown below:

On the Title Page
Column 2 (OTHER PUBLICATIONS), Line 2, delete "Appln" and insert -- Appln. --.

In the Claims
Claim 1, Column 25, Line 50, after "to the" delete "new".
Claim 13, Column 28, Line 12, after "to the" delete "new".

Signed and Sealed this
Twenty-third Day of April, 2024

*Katherine Kelly Vidal*

Katherine Kelly Vidal
*Director of the United States Patent and Trademark Office*